United States Patent
Kim et al.

(10) Patent No.: US 11,115,790 B2
(45) Date of Patent: Sep. 7, 2021

(54) METHOD FOR PERFORMING V2X COMMUNICATION IN WIRELESS COMMUNICATION SYSTEM AND APPARATUS THEREFOR

(71) Applicant: LG Electronics Inc., Seoul (KR)

(72) Inventors: Taehun Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 16/611,408

(22) PCT Filed: May 8, 2018

(86) PCT No.: PCT/KR2018/005274
§ 371 (c)(1),
(2) Date: Nov. 6, 2019

(87) PCT Pub. No.: WO2018/208061
PCT Pub. Date: Nov. 15, 2018

(65) Prior Publication Data
US 2020/0145798 A1 May 7, 2020

Related U.S. Application Data

(60) Provisional application No. 62/508,291, filed on May 18, 2017, provisional application No. 62/503,950, (Continued)

(51) Int. Cl.
*H04W 4/40* (2018.01)
*H04W 48/16* (2009.01)
(Continued)

(52) U.S. Cl.
CPC ............. *H04W 4/40* (2018.02); *H04L 5/001* (2013.01); *H04W 48/16* (2013.01); *H04W 76/14* (2018.02); *H04W 92/18* (2013.01)

(58) Field of Classification Search
None
See application file for complete search history.

(56) References Cited

U.S. PATENT DOCUMENTS

2017/0150490 A1* 5/2017 Chen .................. H04W 76/27
2018/0132208 A1* 5/2018 Pan .................. H04W 72/0406
(Continued)

FOREIGN PATENT DOCUMENTS

WO WO2016020072 2/2016
WO WO2017030338 2/2017

OTHER PUBLICATIONS

LG Electronics, "Supporting cross-carrier operation for V2X communication over PC5," C1-172322, 3GPP TSG-CT WG1 Meeting #104, Zhangjiajie, P.R of China, May 15-19, 2017, 5 pages.
(Continued)

*Primary Examiner* — Duc T Duong
(74) *Attorney, Agent, or Firm* — Fish & Richardson P.C.

(57) ABSTRACT

A method for performing a V2X communication in a wireless communication system and a device therefor are disclosed. A method for performing, by a user equipment (UE), a vehicle-to-everything (V2X) communication in a wireless communication system includes receiving a transmission request of a V2X message from an upper layer, when receiving the transmission request of the V2X message, selecting a resource for the V2X communication over a PC5 interface if the UE is 'Not served by evolved universal terrestrial radio access network (E-UTRAN) for V2X communication', and performing a transmission for the V2X
(Continued)

communication over the PC5 interface. If the UE is camped on a cell supporting the V2X communication, and a carrier frequency provided by the cell on which the UE is camped does not belong to a pre-configured carrier frequency the UE intends to use, the UE is considered as 'Not served by E-UTRAN for V2X communication'.

6 Claims, 7 Drawing Sheets

Related U.S. Application Data filed on May 10, 2017, provisional application No. 62/503,865, filed on May 9, 2017, provisional application No. 62/502,799, filed on May 8, 2017.

(51) Int. Cl.
*H04W 76/14* (2018.01)
*H04L 5/00* (2006.01)
*H04W 92/18* (2009.01)

(56) References Cited

U.S. PATENT DOCUMENTS

| | | | |
|---|---|---|---|
| 2019/0124489 A1* | 4/2019 | Ahmad | H04W 4/40 |
| 2019/0124669 A1* | 4/2019 | Luo | H04W 4/027 |
| 2019/0132832 A1* | 5/2019 | Uchiyama | H04W 4/40 |
| 2019/0150082 A1* | 5/2019 | Kedalagudde | H04W 4/46 370/329 |
| 2019/0174344 A1* | 6/2019 | Karelia | H04L 43/062 |
| 2019/0182639 A1* | 6/2019 | Basu Mallick | H04W 8/24 |

OTHER PUBLICATIONS

LG Electronics, "Update of 'Not served by E-UTRAN' to support cross-carrier operation for V2X communication over PC5," C1-172321, 3GPP TSG CT WG1 Meeting #104, Zhangjiajie, P.R. of China, May 15-19, 2017, 4 pages.

Qualcomm Incorporated, "Addition of definition for "not served by E-UTRAN"," C1-172068, 3GPP TSG-CT WG1 Meeting #104, Zhangjiajie, P.R of China, May 15-19, 2017, 3 pages.

3rd Generation Partnership Project; Technical Specification Group Core Network and Terminals; "User Equipment (UE) to V2X control function; protocol aspects; Stage 3 (Release 14)," 3GPP TS 24.386 V14.0.0, dated Mar. 3, 2017, 33 pages.

3rd Generation Partnership Project; Technical Specification Group Services and System Aspects; "Study on LTE support for V2X services (Release 14)," 3GPP TR 22.885 V2.0.0, dated Dec. 2015, 51 pages.

CATT, "Discussion on resource pool sharing between mode 3 and mode 4," R1-1704528, 3GPP TSG RAN WG1 Meeting #88bis, Spokane, USA, dated Apr. 3-7, 2017, 3 pages.

Ericsson, "On V2X Sidelink Cross-Carrier Configuration," R2-1700935, 3GPP TSG-RAN WG2 #97, Athens, Greece, dated Feb. 13-17, 2017, 4 pages.

Qualcomm Incorporated, LG Electronics, Ericsson, "Clarification for definition of "not served by E-UTRAN"," S2-172304, SA WG2 Meeting #120, Busan, South Korea, dated Mar. 27-31, 2017, 3 pages.

3rd Generation Partnership Project; Technical Specification Group Core Network and Terminals, "Proximity-services (ProSe) User Equipment (UE) to Prose function protocol aspects; Stage 3 (Release 13)," 3GPP TS 24.334, V13.6.0, dated Dec. 2016, 260 pages.

EP Extended European Search Reportin European Appln. No. 18799018.9, dated Dec. 18, 2020, 10 pages.

\* cited by examiner (a) Control plane protocol stack (b) User plane protocol stack

METHOD FOR PERFORMING V2X COMMUNICATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/005274, filed on May 8, 2018, which claims the benefit of U.S. Provisional Application No. 62/508,291, filed on May 18, 2017, U.S. Provisional Application No. 62/503,950, filed on May 10, 2017, U.S. Provisional Application No. 62/503,865, filed on May 9, 2017, and U.S. Provisional Application No. 62/502,799, filed on May 8, 2017. The disclosures of the prior applications are incorporated by reference in their entirety.

TECHNICAL FIELD

The present disclosure relates to a wireless communication system, and more particularly to a method for performing/supporting a vehicle-to-everything (V2X) communication and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method for performing, by a UE, a V2X communication over PC5 (i.e., radio interface/reference point between UEs (or vehicles)).

Another object of the present disclosure is to provide a method for performing, by a UE, a V2X communication by selecting an appropriate cell (or carrier frequency) when supporting a cross-carrier scheduling operation for the V2X communication over PC5.

Technical problems to be solved by the present disclosure are not limited by the technical problems mentioned above, and other technical problems which are not mentioned above can be clearly understood from the following description by a person having ordinary skill in the art to which the present disclosure pertains.

Technical Solution

In one aspect, there is provided a method for performing, by a user equipment (UE), a vehicle-to-everything (V2X) communication in a wireless communication system, the method comprising receiving a transmission request of a V2X message from an upper layer, when receiving the transmission request of the V2X message, selecting a resource for the V2X communication over a PC5 interface if the UE is 'Not served by evolved universal terrestrial radio access network (E-UTRAN) for V2X communication', and performing a transmission for the V2X communication over the PC5 interface, wherein if the UE is camped on a cell supporting the V2X communication, and a carrier frequency provided by the cell on which the UE is camped does not belong to a pre-configured carrier frequency the UE intends to use, the UE is considered as 'Not served by E-UTRAN for V2X communication'.

In another aspect, there is provided a user equipment (UE) performing a vehicle-to-everything (V2X) communication in a wireless communication system, the UE comprising a communication module configured to transmit and receive a radio signal, and a processor configured to control the communication module, wherein the processor is configured to receive a transmission request of a V2X message from an upper layer, when receiving the transmission request of the V2X message, select a resource for the V2X communication over a PC5 interface if the UE is 'Not served by evolved universal terrestrial radio access network (E-UTRAN) for V2X communication', and perform a transmission for the V2X communication over the PC5 interface, wherein if the UE is camped on a cell supporting the V2X communication, and a carrier frequency provided by the cell on which the UE is camped does not belong to a pre-configured carrier frequency the UE intends to use, the UE is considered as 'Not served by E-UTRAN for V2X communication'.

When the UE receives the transmission request of the V2X message, the UE may request a resource for the V2X communication over the PC5 interface from a base station or select a resource for the V2X communication over the PC5 interface in a resource pool pre-configured by the base station, if the UE is 'Served by E-UTRAN for V2X communication'.

If the UE is camped on a cell not providing any radio resource for the V2X communication over the PC5 interface, the UE may be considered as 'Served by E-UTRAN for V2X communication'.

The cell on which the UE is camped may operate on the carrier frequency, or the carrier frequency may be indicated in a system information block (SIB) 21 broadcasted by the cell on which the UE is camped.

If one or more carrier frequencies provided by the cell on which the UE is camped belong to the pre-configured carrier frequency, the UE may be considered as 'Not served by E-UTRAN for V2X communication' or 'Served by E-UTRAN for V2X communication'.

When the UE wants to perform the V2X communication on the pre-configured carrier frequency among one or more carrier frequencies provided by the cell on which the UE is camped, the UE may be considered as 'Served by E-UTRAN for V2X communication'.

The UE may search a cell operating on a carrier frequency on which the UE wants to perform the V2X communication among the carrier frequency provided by the cell on which the UE is camped.

If the UE fails to search the cell operating on the carrier frequency on which the UE wants to perform the V2X communication among the carrier frequency provided by the cell on which the UE is camped, the UE may be considered as 'Not served by E-UTRAN for V2X communication'.

When the UE does not want to perform the V2X communication on the pre-configured carrier frequency, the UE may be considered as 'Not served by E-UTRAN for V2X communication'.

The cell on which the UE is camped may operate in a Mode 3 in which a specific resource to be used by the UE for the V2X communication is allocated by a base station, or a Mode 4 in which a resource to be used by the UE for the V2X communication is selected in a resource pool configured by the base station.

Advantageous Effects

According to embodiments of the disclosure, a UE can efficiently perform a V2X communication.

According to embodiments of the disclosure, a UE can efficiently perform a V2X communication when supporting a cross-carrier scheduling operation for the V2X communication over PC5.

Effects obtainable from the present disclosure are not limited by the effects mentioned above, and other effects which are not mentioned above can be clearly understood from the following description by a person having ordinary skill in the art to which the present disclosure pertains.

DESCRIPTION OF DRAWINGS

The accompanying drawings, that are included to provide a further understanding of the present disclosure and are incorporated in and constitute a part of this specification, illustrate embodiments of the present disclosure and together with the description serve to explain various principles of the present disclosure.

MODE FOR INVENTION

Figure 1:
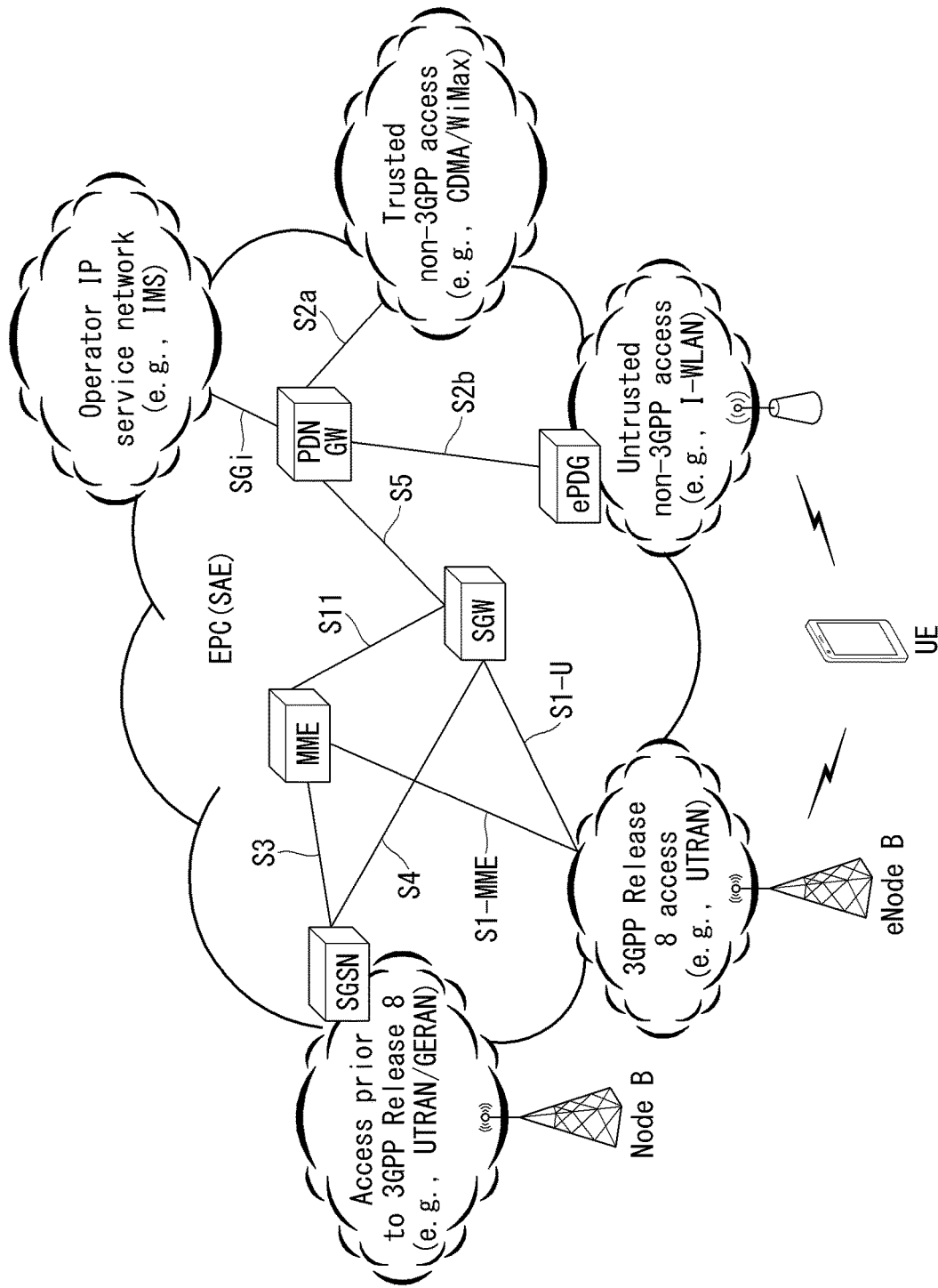
FIG. 1 is a diagram schematically exemplifying an evolved packet system (EPS) to which the present disclosure can be applied.

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure may be embodied without the specific information.

For some cases, to avoid obscuring the technical principles of the present disclosure, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure may be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure may be supported by the documents above. Also, all of the terms disclosed in this document may be explained with reference to the standard documents.

To clarify the descriptions, this document is based on the 3GPP LTE/LTE-A, but the technical features of the present disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

Public Land Mobile Network (PLMN): a network formed to provide mobile communication services to individuals. The PLMN may be formed separately for each operator.

In what follows, the present disclosure will be described based on the terms defined above.

Overview of System to which the Present Disclosure May be Applied

FIG. 1 illustrates an Evolved Packet System (EPS) to which the present disclosure may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
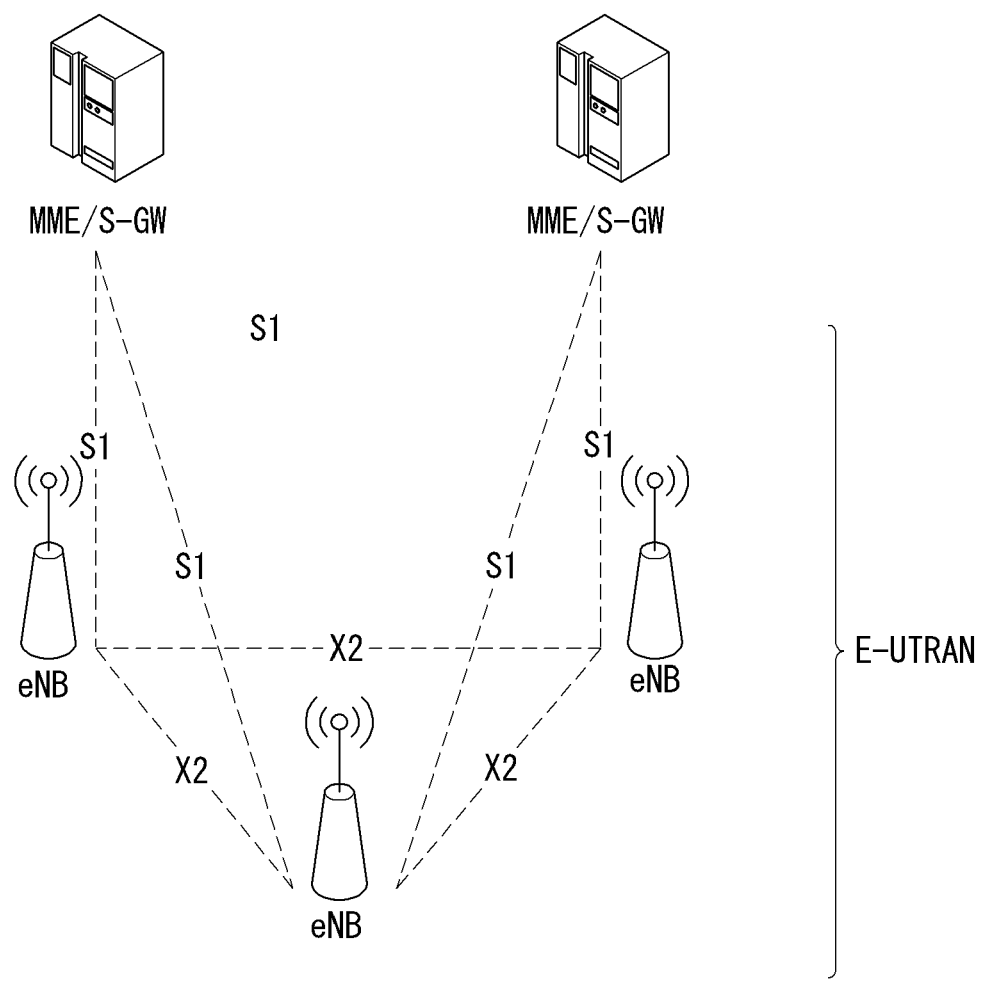
FIG. 2 illustrates an example of evolved universal terrestrial radio access network structure to which the present disclosure can be applied.

FIG. 2 illustrates one example of an Evolved Universal Terrestrial Radio Access Network (E-UTRAN) to which the present disclosure may be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
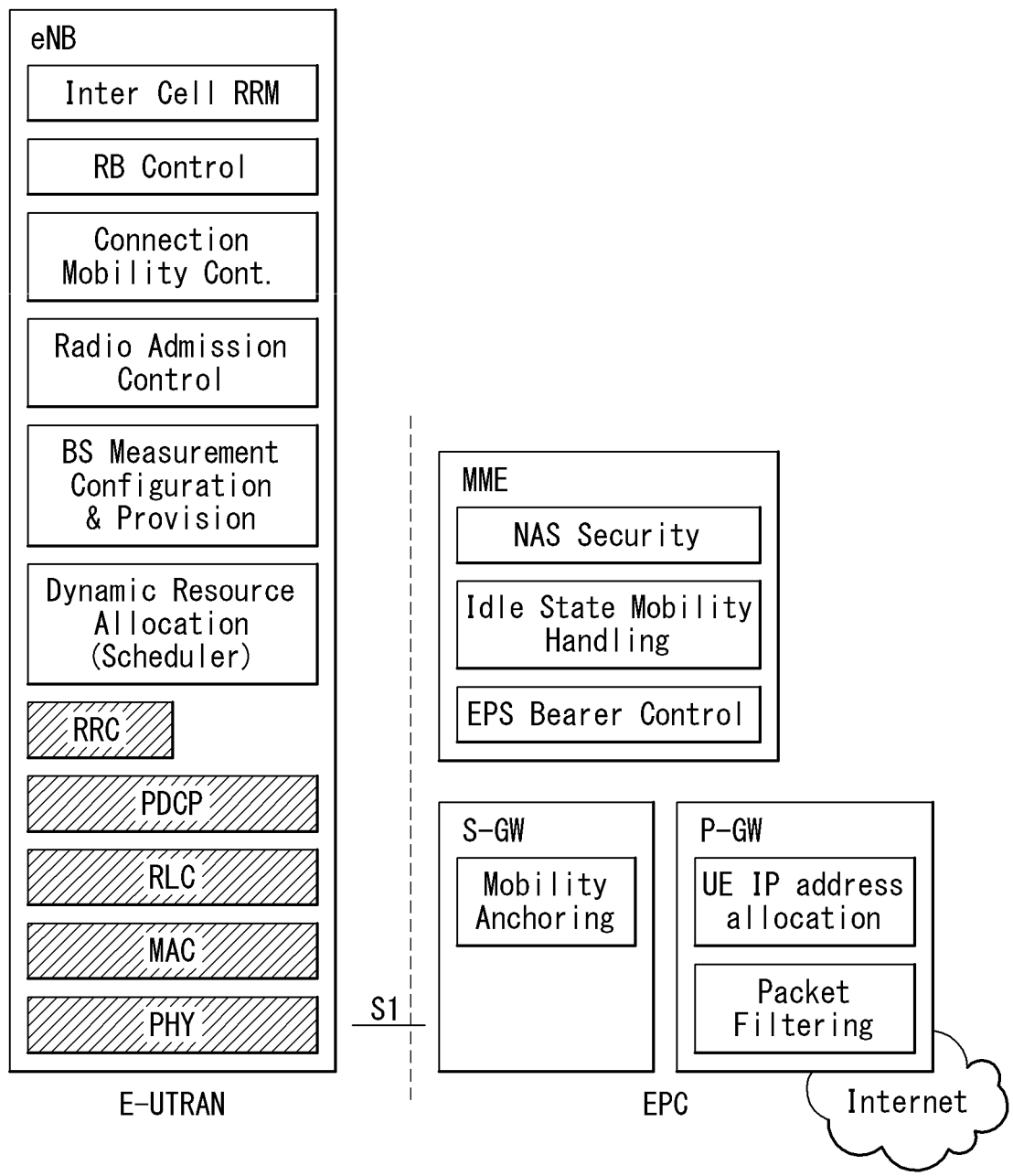
FIG. 3 exemplifies a structure of E-UTRAN and EPC in a wireless communication system to which the present disclosure can be applied.

FIG. 3 exemplifies a structure of E-UTRAN and EPC in a wireless communication system to which the present disclosure may be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

Figure 4:
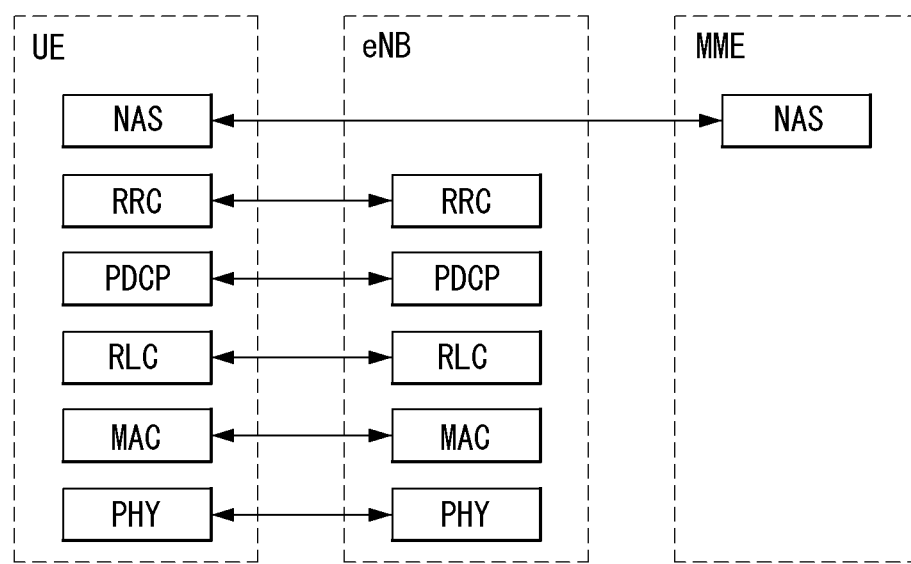
FIG. 4 illustrates a structure of a radio interface protocol between a UE and E-UTRAN in a wireless communication system to which the present disclosure can be applied.
Figure 4:
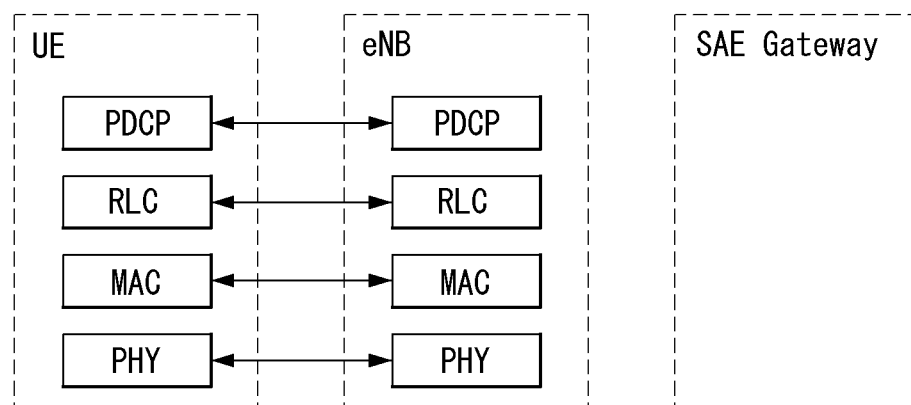

FIG. 4 illustrates a radio interface protocol structure between a UE and an E-UTRAN in a wireless communication system to which the present disclosure may be applied.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
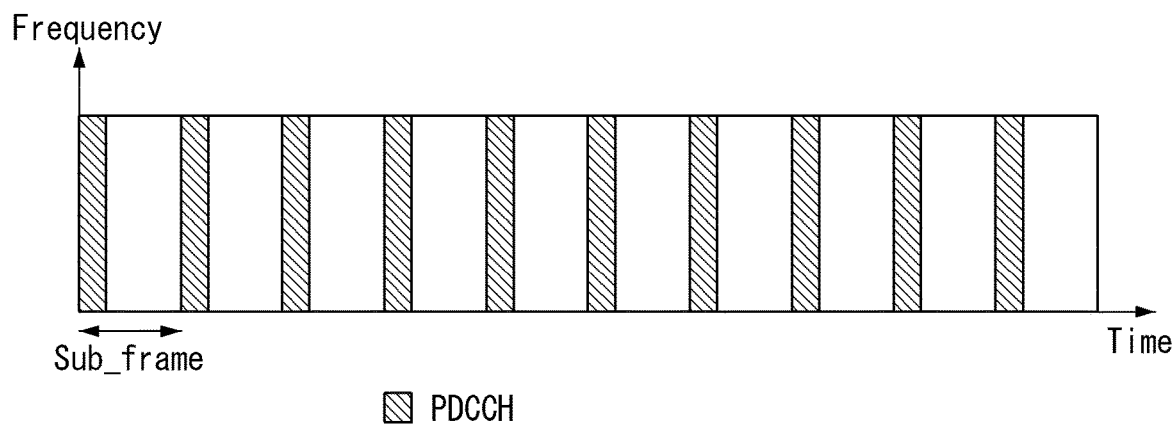
FIG. 5 is a diagram schematically showing a structure of a physical channel in a wireless communication system to which the present disclosure may be applied.

FIG. 5 is a diagram schematically exemplifying a structure of physical channel in a wireless communication system to which the present disclosure may be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

Figure 6:
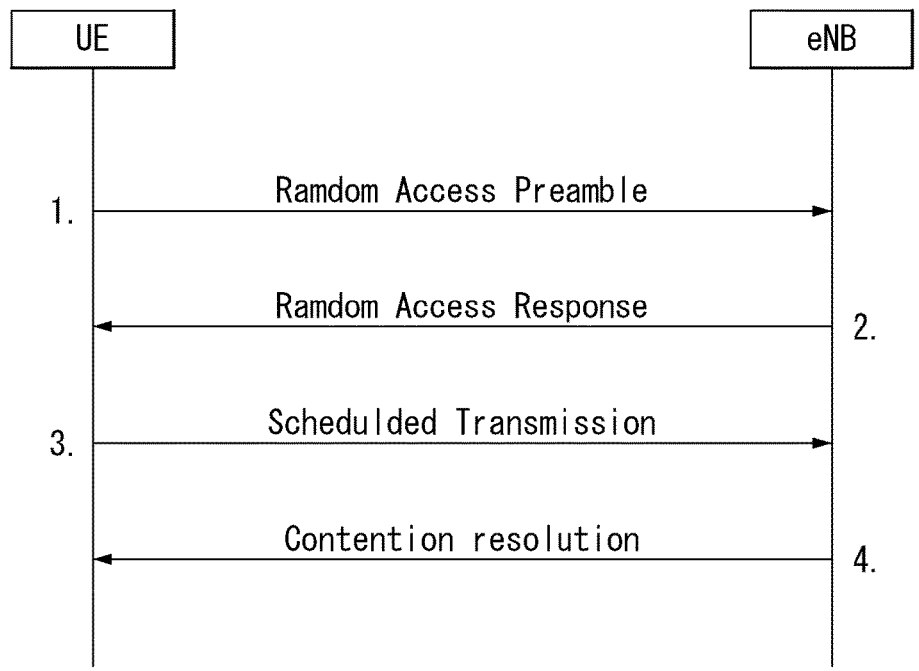
FIG. 6 is a diagram for describing a contention based random access procedure in a wireless communication system to which the present disclosure may be applied.

FIG. 6 is a diagram for describing the contention-based random access procedure in the wireless communication system to which the present disclosure may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in this specification are described below.

Dedicated bearer: an EPS bearer associated with an uplink packet filter(s) within a UE and a downlink packet filter(s) within a P-GW. In this case, only a specific packet is matched with the filter(s).

Default bearer: an EPS bearer established even new PDN connection. Context of a default bearer is maintained during the lifetime of a PDN connection.

EPS mobility management (EMM)-EMM-NULL state: an EPS service within a UE is deactivated. Any EPS mobility management function is not performed.

EMM-DEREGISTERED state: in the EMM-DEREGISTERED state, EMM context is not established and an MME is not notified of a UE location. Accordingly, the UE is unreachable by the MME. In order to establish EMM context, the UE needs to start an Attach or combined Attach procedure.

EMM-REGISTERED state: In the EMM-REGISTERED state, EMM context within a UE has been established and default EPS bearer context has been activated. When a UE is in the EMM-IDLE mode, an MME is notified of a UE location with accuracy of a list of TAs including a specific number of a TA. The UE may initiate the transmission and reception of user data and signaling information and may respond to paging. Furthermore, a TAU or combined TAU procedure is performed.

EMM-CONNECTED mode: when an NAS signaling connection is set up between a UE and a network, the UE is the EMM-CONNECTED mode. The term "EMM-CONNECTED" may be referred to as a term "ECM-CONNECTED state."

EMM-IDLE mode: when an NAS signaling connection is not present between a UE and a network (i.e., an EMM-IDLE mode without suspend indication) or RRC connection suspend is indicated by a lower layer (i.e.,
an EMM-IDLE mode with suspend indication), the UE is in the EMM-IDLE mode. The term "EMM-IDLE" may be referred to as a term "ECM-IDLE state."

EMM context: when an Attach procedure is successfully completed, EMM context is established between a UE and an MME.

Control plane CIoT EPS optimization: signaling optimization that enables the efficient transport of user data (IP, non-IP or SMS) through a control plane via an MME. This may optionally include the header compression of IP data.

User plane CIoT EPS optimization: signaling optimization that enables the efficient transport of user data (IP or non-IP) through a user plane.

EPS service(s): a service(s) provided by a PS domain.

NAS signaling connection: a peer-to-peer S1 mode connection between a UE and an MME. An NAS signaling connection has a concatenation of an RRC connection via an LTE-Uu interface and an S1AP connection via an S1 interface.

UE using EPS services with control plane CIoT EPS optimization: UE attached for EPS services with control plane CIoT EPS optimization approved by a network Non-access stratum (NAS): a functional layer for exchanging an UMTS, signaling between a UE and a core network in an EPS protocol stack, and a traffic message. This has a main function of supporting the mobility of a UE and supporting a session management procedure of establishing and maintaining an IP connection between a UE and a PDN GW.

Access stratum (AS): this means a protocol layer under the NAS layer on the interface protocol between an E-UTRAN (eNB) and a UE or between an E-UTRAN (eNB) and an MME. For example, in the control plane protocol stack, the RRC layer, PDCP layer, RLC layer, MAC layer and PHY layer may be collectively referred to as an AS layer or any one of the layers may be referred to as an AS layer. Or, in the user plane protocol stack, the PDCP layer, RLC layer, MAC layer and PHY layer may be collectively referred to as an AS layer or any one of the layers may be referred to as an AS layer.

S1 mode: a mode applied to a system having functional separation according to the use of an S1 interface between a radio access network and a core network. The S1 mode includes a WB-S1 mode and an NB-S1 mode.

NB-S1 mode: this mode is applied by a UE when a serving radio access network of the UE provides access to a network service (via E-UTRA) based on a narrow band (NB)-Internet of things (IoT).

WB-S1 mode: this mode is applied when a system operates in the S1 mode, but is not the NB-S1 mode.

Not Served by E-UTRAN in Proximity-Based Services (ProSe)

"Not served by E-UTRAN" is defined when the UE is:

outside of E-UTRAN coverage;

within E-UTRAN coverage but not camped on any cell;

within E-UTRAN coverage but camped on a non-E-UTRAN cell;

camped on an E-UTRAN cell not operating on a carrier frequency provisioned for ProSe direct service.

ProSe Direct Communication

A UE behavior specified in 3GPP TS 24.334 is as follows.

10 ProSe direct communication 10.1 General

A procedure at a UE and a procedure between UEs for ProSe direct communication over PC5 interface (i.e., direct interface between UEs) are described below.

When served by E-UTRAN, the UE shall be authorized for ProSe direct communication in a registered PLMN based on a service authorization procedure before initiating ProSe direct communication.

When not served by E-UTRAN, the UE shall be authorized for ProSe direct communication for "not served by E-UTRAN" based on the service authorization procedure before initiating ProSe direct communication.

10.2 One-to-Many ProSe Direct Communication 10.2.1 General

One-to-many ProSe direct communication is applicable only to ProSe-enabled public safety UEs. One-to-many ProSe direct communication is applicable only when the UE is:

a) served by E-UTRAN and authorized for ProSe direct communication in the registered PLMN;

b) not served by E-UTRAN and authorized for ProSe direct communication for "not served by E-UTRAN"; or c) in an EMM-IDLE mode and in a limited service state as specified in 3GPP TS 23.122 and authorized for ProSe direct communication when "not served by E-UTRAN", if a reason for the UE being in the limited service state is one of the following:

i) the UE is unable to find a suitable cell in the selected PLMN as specified in 3GPP TS 36.304;

ii) the UE receives an ATTACH REJECT message or a TRACKING AREA UPDATE REJECT message or a SERVICE REJECT message including the EMM cause #11 "PLMN not allowed" as specified in 3GPP TS 24.301, or the UE receives a LOCATION UPDATING REJECT message or a GPRS ATTACH REJECT message or ROUTING AREA UPDATE REJECT message or SERVICE REJECT message including cause #11 "PLMN not allowed" as specified in 3GPP TS 24.008; or iii) the UE receives an ATTACH REJECT message or a TRACKING AREA UPDATE REJECT message or a SERVICE REJECT message including the EMM cause #7 "EPS services not allowed" as specified in 3GPP TS 24.301, or the UE receives a LOCATION UPDATING REJECT message or a GPRS ATTACH REJECT message or ROUTING AREA UPDATE REJECT message including cause #7 "GPRS services not allowed" as specified in 3GPP TS 24.008.

Upon receiving a request from upper layers to send or receive data for ProSe direct communication in a given group, the UE initiates a procedure for ProSe direct communication. For the case a), the UE performs ProSe direct communication procedures specified in subclause 10.2.2 below. For the cases b) and c), the UE performs ProSe direct communication procedures specified in subclause 10.2.3 below.

If the UE is camped on an E-UTRAN cell not operating on a carrier frequency provisioned for ProSe direct communication which indicates that ProSe direct communication is supported by the network, the UE can perform either ProSe direct communication procedures specified in subclause 10.2.2 below or ProSe direct communication procedures specified in subclause 10.2.3 below.

The UE obtains ProSe direct communication policy parameters for a group, except for the evolved Multimedia Broadcast Multicast Service (eMBMS) content to be relayed by one-to-many ProSe direct communication.

If the ProSe direct communication policy parameters indicate that the UE has been configured to use Internet protocol version 6 (IPv6) for the corresponding group, the UE auto-configures a link local IPv6 address defined in RFC (request for comments) 4862. This address can only be used as a source Internet protocol (IP) address for one-to-many ProSe direct communication.

If the ProSe direct communication policy parameters indicate that the UE has been configured to use Internet protocol version 4 (IPv4) for the corresponding group, the UE:

uses the configured IPv4 address for the corresponding group as a source address; or if there is no configured IPv4 address for the corresponding group, uses dynamic configuration of IPv4 link-local addresses as specified in Internet engineering task force (IETF) RFC 3927.

10.2.2 ProSe Direct Communication Facilitated by Serving E-UTRAN

When the UE is served by E-UTRAN and intends to use the ProSe radio resources (i.e. carrier frequency) provided by an E-UTRAN cell, the UE requests parameters for transmitting or receiving ProSe direct communication from the lower layers. The UE performs direct communication only if the lower layers indicate that ProSe direct communication is supported by the network. If the UE in the EMM-IDLE mode has to request resources for ProSe direct communication, the UE performs a service request procedure or a tracking area update procedure as specified in 3GPP TS 24.301. Once the radio resources for transmitting or receiving ProSe direct communication are provided by eNB as specified in 3GPP TS 36.331, the UE starts ProSe direct communication.

10.2.3 Procedure for UE to Use Provisioned Radio Resources

When the UE is not served by E-UTRAN, the UE selects the radio parameters to be used for ProSe direct communication as follows:

if the UE can determine itself located in a geographical area, and is provisioned with radio parameters for the geographical area, the UE selects the radio parameters associated with the corresponding geographical area; or in all other cases, the UE does not initiate ProSe direct communication.

When the UE is in coverage of a 3GPP RAT, the UE may determine itself located in a specific geographical area, for example, using information derived from the serving PLMN. Further, when the UE is not in coverage of the 3GPP RAT, the UE may determine itself located in a specific geographical area using other techniques as determined by local regulations.

Before initiating ProSe direct communication, the UE checks with lower layers whether the selected radio parameters can be used in a current location without causing interference to other cells as specified in 3GPP TS 36.331, and:

if the lower layers indicate that the corresponding usage would not cause any interference, the UE initiates ProSe direct communication; or If the lower layers find that there exists a cell operating the provisioned radio resources (i.e., carrier frequency), the corresponding cell belongs to the registered PLMN or a PLMN equivalent to the registered PLMN, and the UE is authorized for ProSe direct communication in this PLMN, the UE can use the radio parameters indicated by the cell as specified in 3GPP TS 36.331.

else if the lower layers report that one or more PLMNs operate in the provisioned radio resources (i.e., carrier frequency):
      a) if the following conditions are met:
        1) none of the PLMNs reported by the lower layers is the registered PLMN or the PLMN equivalent to the registered PLMN; and
        2) at least one of the PLMNs reported by the lower layers is in the list of authorized PLMNs for ProSe direct communication and provides radio resources for ProSe direct communication as specified in 3GPP TS 36.331;
      then, the UE:
        1) if the UE is in the EMM-IDLE mode, performs PLMN selection triggered by ProSe direct communication as specified in 3GPP TS 23.122; or
        2) else, if the UE is in the EMM-CONNECTED mode, either:
          i) performs a detach procedure as specified in 3GPP TS 24.301 and then performs PLMN selection triggered by ProSe direct communication as specified in 3GPP TS 23.122; or
          ii) does not initiate ProSe direct communication.
      Whether the UE performs i) or ii) above is left up to UE implementation; or
      b) else, if the above conditions are not met, the UE does not initiate ProSe direct communication.

If the registration to the selected PLMN is successful, the UE proceeds with the procedure to initiate ProSe direct communication as specified in subclause 10.2.2 described above.

If the UE is performing ProSe direct communication using radio parameters associated with a geographical area and moves out of the corresponding geographical area, the UE stops performing ProSe direct communication, and:

if the UE is not served by E-UTRAN or the UE intends to use radio resources for ProSe other than radio resources operated by the serving E-UTRAN cell, the UE selects appropriate radio parameters for a new geographical area as described above; or
    if the UE is served by E-UTRAN and intends to use radio resources for ProSe operated by the serving E-UTRAN cell, the UE proceeds with the procedure to initiate ProSe direct communication when served by E-UTRAN.

Vehicle-to-Everything (V2X) communication over PC5
V2X communication operation over PC5 as specified in 3GPP TS 24.386 is as follows.

6.1 V2X Communication Over PC5
6.1.1 General
A procedure at a UE or a procedure between UEs for V2X communication over PC5 is described below.

Both Internet protocol (IP) based and non-IP based V2X communication over PC5 are supported. For IP based V2X communication, only IPv6 is used, and IPv4 is not supported.

6.1.2 Transmission of V2X Communication Over PC5
6.1.2.1 Initiation

The upper layers can request the UE to send a V2X message of a V2X service identified by a V2X service identifier using V2X communication over PC5.

The request from the upper layers includes:
    a) the V2X message;
    b) the V2X service identifier of the V2X service for the V2X message;
    c) a type of data in the V2X message (IP or non-IP);
    d) if the V2X message contains non-IP data, an indication to set a non-IP type field of non-IP type PDU to a value corresponding to a V2X message family; and
    e) V2X message priority.

Upon receiving a request from the upper layers to send a V2X message of a V2X service identified by a V2X service identifier using V2X communication over PC5, the UE proceeds as follows:

a) if the following conditions are met (i.e., a) means the operation of "served by E-UTRAN"):
      1) the UE is "served by E-UTRAN";
      2) the UE intends to use the radio resources (i.e., carrier frequency) provided by an E-UTRAN cell;
      3) the registered PLMN is in a list of PLMNs in which the UE is authorized to use V2X communication over PC5 when the UE is "served by E-UTRAN"; and
      4) the V2X service identifier of the V2X service is included in the list of V2X services authorized for V2X communication over PC5, or the UE is configured with a default destination Layer-2 identifier (ID) for V2X communication over PC5;
    then, the UE:
      1) requests radio resources for V2X communication over PC5 as specified in subclause 10.2.2; and
      2) performs transmission of V2X communication over PC5 as specified in subclause 6.1.2.2.
    b) if the following conditions are met (i.e., b) means the operation of "Not served by E-UTRAN"):
      1) the UE is:
        A) "not served by E-UTRAN"; or
        B) in a limited service state, if a reason for the UE being in the limited service state is one of the followings;
          i) the UE is unable to find a suitable cell in the selected PLMN;
          ii) the UE receives an ATTACH REJECT message or a TRACKING AREA UPDATE REJECT message or a SERVICE REJECT message including the EMM cause #11 "PLMN not allowed", or the UE receives a LOCATION UPDATING REJECT message or a GPRS ATTACH REJECT message or a ROUTING AREA UPDATE REJECT message including the EMM cause #11 "PLMN not allowed"; or
          iii) the UE receives an ATTACH REJECT message or a TRACKING AREA UPDATE REJECT message or a SERVICE REJECT message including the EMM cause #7 "EPS services not allowed", or the UE receives a LOCATION UPDATING REJECT message or a GPRS ATTACH REJECT message or a ROUTING AREA UPDATE REJECT message or a SERVICE REJECT message including the EMM cause #7 "GPRS services not allowed"; or
        C) in the limited service state for reasons other than the i), ii) and iii), and located in a geographical area for which the UE is provisioned with "non-operator managed" radio parameters;
      2) the UE is authorized to use V2X communication over PC5 when the UE is not served by E-UTRAN; and
      3) the V2X service identifier of the V2X service is included in the list of V2X services authorized for V2X communication over PC5, or the UE is configured with a default destination Layer-2 ID for V2X communication over PC5;
    then, the UE:
      1) selects radio resources for V2X communication over PC5 as specified in subclause 6.1.2.3; and
      2) performs transmission of V2X communication over PC5 as specified in subclause 6.1.2.2;
    Otherwise, the UE does not perform V2X communication over PC5.

6.1.2.2 Transmission

The UE includes the V2X message in a protocol data unit (PDU) and passes the corresponding PDU to the lower layers for transmission along with the following parameters:

a) a Layer-3 protocol data unit type set to:
  1) IP packet, if the V2X message contains IP data; or
  2) non-IP packet, if the V2X message contains non-IP data;

b) the source Layer-2 ID self-assigned by the UE for V2X communication over PC5;

c) the destination Layer-2 ID set to:
  1) the destination Layer-2 ID associated with the V2X service identifier of the V2X service in the list of V2X services authorized for V2X communication over PC5, if the V2X service identifier of the V2X service is included in the list of V2X services authorized for V2X communication over PC5; or
  2) the default destination Layer-2 ID configured to the UE for V2X communication over PC5, if the V2X service identifier of the V2X service is not included in the list of V2X services authorized for V2X communication over PC5 and the UE is configured with a default destination Layer-2 ID for V2X communication over PC5;

d) if the V2X message contains non-IP data, an indication to set a non-IP type field of the non-IP type PDU to a value corresponding to the V2X message family used by the V2X service as indicated by the upper layers;

e) if the V2X message contains IP data, the source IP address set to the source IP address self-assigned by the UE for V2X communication over PC5;

f) the ProSe per-packet priority set to a value corresponding to the V2X message priority received from the upper layers (the mapping of V2X message priority to ProSe per-packet priority is configured on the UE); and g) if the UE is configured with packet delay budget (PDB)-to-ProSe per-Packet priority mapping rules for V2X communication over PC5, the PDB associated with the ProSe per-packet priority.

If the UE has an emergency PDN connection, the UE sends an indication to the lower layers to prioritize transmission over the emergency PDN connection as compared to transmission of V2X communication over PC5.

6.1.2.3 Procedure for UE to use provisioned radio resources for V2X communication over PC5

When the UE is not served by E-UTRAN, the UE selects the radio parameters to be used for V2X communication over PC5 as follows:

- if the UE can determine itself located in a geographical area and is provisioned with radio parameters for the geographical area, the UE selects the radio parameters associated with that geographical area; or
- in all other cases, the UE does not initiate V2X communication over PC5.

When the UE is in coverage of a 3GPP RAT, the UE may determine itself located in a specific geographical area, for example, using information derived from the serving PLMN. Further, when the UE is not in coverage of the 3GPP RAT, the UE may determine itself located in a specific geographical area using other techniques (e.g., global navigation satellite system (GNSS)) as determined by local regulations.

If the UE wants to use "operator managed" radio parameters before initiating V2X communication over PC5, the UE checks with the lower layers whether the selected radio parameters can be used in a current location without causing interference to other cells.

- if the lower layers indicate that the usage would not cause any interference, the UE initiates V2X communication over PC5; or
- else if the lower layers report that one or more PLMNs operate in the provisioned radio resources (i.e., carrier frequency):
  a) if the following conditions are met:
    1) none of the PLMNs reported by the lower layers is the registered PLMN or the PLMN equivalent to the registered PLMN;
    2) at least one of the PLMNs reported by the lower layers is in the list of authorized PLMNs for V2X communication over PC5 and provides radio resources for V2X communication over PC5; and
    3) the UE does not have an emergency PDN connection;
  then, the UE:
    1) if the UE is in the EMM-IDLE mode, performs PLMN selection triggered by V2X communication over PC5; or
    2) else if the UE is in the EMM-CONNECTED mode, either:
      i) performs a detach procedure and then performs PLMN selection triggered by V2X communication over PC5; or
      ii) does not initiate ProSe direct communication.
    Whether the UE performs i) or ii) above is left up to UE implementation.
  b) else, the UE does not initiate V2X communication over PC5.

If the registration to the selected PLMN is successful, the UE proceeds with the procedure to initiate V2X communication over PC5.

If the UE is performing V2X communication over PC5 using radio parameters associated with a geographical area and moves out of the geographical area, the UE stops performing V2X communication over PC5:

- if the UE is not served by E-UTRAN or the UE intends to use radio resources for V2X communication over PC5 other than radio resources operated by the serving E-UTRAN cell, the UE selects appropriate radio parameters for a new geographical area; or
- if the UE is served by E-UTRAN and intends to use radio resources for V2X communication over PC5 operated by the serving E-UTRAN cell, the UE proceeds with the procedure to initiate V2X communication over PC5 when served by E-UTRAN.

6.1.2.4 Privacy of V2X Transmission Over PC5

Upon initiating transmission of V2X communication over PC5, if timer T5000 is not running, the UE starts the timer T5000.

Upon:
a) getting an indication from upper layers that an application layer identifier has been changed; or
b) timer T5000 expiration,
the UE:
a) changes a value of a source Layer-2 ID self-assigned by the UE for V2X communication over PC5;
b) if a V2X message contains IP data, changes a value of a source IP address self-assigned by the UE for V2X communication over PC5; and
c) restarts the timer T5000.

Upon stopping transmission of V2X communication over PC5, the UE stops the timer T5000.

6.1.3 Reception of V2X Communication Over PC5

The UE can be configured by the upper layers with one or more destination Layer-2 ID(s) for reception of V2X communication over PC5. For each received PDU over PC5, the receiving UE checks whether the destination Layer-2 ID of the received PDU matches one of the configured destination Layer-2 ID(s). If yes, the UE checks whether the PDU type provided by the lower layers for the received packet is set to IP packet or non-IP packet, and passes the PDU to the corresponding upper layer entity.

Method for Performing V2X Communication

For ProSe direct communication, one carrier frequency is provisioned for ProSe direct communication per a given geographical area. On the other hand, for V2X, one or more carrier frequencies may be provisioned for V2X communication per a given geographical area.

3GPP RAN2 working group has identified an issue on the definition of "Not served by E-UTRAN". More specifically, in order to support V2X sidelink cross-carrier configuration, the eNB supports cross-carrier configuration for out-of-coverage carrier. In this instance, carriers capable of providing V2X cross-carrier configuration may be pre-configured. That is, in case of cross-carrier operation, a UE may be instructed by its serving cell to perform V2X communication over a different carrier (e.g., out-of-coverage carrier). In this instance, even if cross-carrier is configured, the UE should be considered as "served by E-UTRAN" since radio resources can be still provided by the serving cell.

Thus, 3GPP SA2 working group agreed to add the following NOTE in TS 23.285 to support the cross-carrier operation in V2X communication.

NOTE 2: When the cross-carrier operation is supported according to TS 36.331, a UE can be instructed by its serving cell to perform V2X communication over a different carrier frequency. The UE is still considered as "served by E-UTRAN" in this case.

In the RAN2 working group, as cross carrier scheduling is introduced, a method to support it is needed. To this end, there is a discussion to change the existing definition of "Not served by E-UTRAN". When the UE is camped on an E-UTRAN cell, which does not instructs the UE not to operate on a carrier frequency provisioned for V2X communication over PC5 and to use a carrier frequency provisioned for V2X communication over PC5, there is a discussion to change a state of the UE to "not served by E-UTRAN". However, there is still a problem.

Considering the above agreements and discussions, by the cross carrier scheduling, when the UE is instructed (scheduled) from the serving cell to use a different carrier frequency (or cell operating on the corresponding carrier frequency), a state of the corresponding UE may be defined as "Served by E-UTRAN", and when the UE is not instructed (scheduled) from the serving cell to use a different carrier frequency (or cell operating on the corresponding carrier frequency), a state of the corresponding UE may be defined as "Not served by E-UTRAN".

Problem 1) Distinguishing simply a state of the UE based on only whether the UE is instructed to use a different carrier frequency (or cell operating on the corresponding carrier frequency) by the cross carrier scheduling cannot cover the following cases, and thus there is a problem.

More specifically, if the serving cell provides a carrier frequency and/or radio resource for V2X communication over PC5 'not belonging' to a carrier frequency 'provisioned' by the cross carrier scheduling, it is preferable that a state of the UE is considered as "Not served by E-UTRAN". On the other hand, if the serving cell provides a carrier frequency and/or radio resource for V2X communication over PC5 'belonging' to a carrier frequency 'provisioned' by the cross carrier scheduling, it is preferable that a state of the UE is considered as "Served by E-UTRAN".

Problem 2) When the UE is camped on a cell not operating on a carrier frequency provisioned for V2X communication over PC5, there is a problem that it does not consider for the case where any carrier frequency and radio resource for V2X communication over PC5 in the corresponding cell are not broadcasted.

Hereinafter, the present disclosure proposes a method for performing V2X communication for solving the problems mentioned above.

The present disclosure is described below focusing on embodiments applying to the EPS system for convenience of explanation, but is not limited thereto. It is a matter of course that the present disclosure can be applied to the fifth generation (5G) system.

The following describes an example of a mapping relationship between terms used in the EPC and terms used in the 5G system.

EMM-CONNECTED (RRC-CONNECTED) mode: CM (Connection Management)-CONNECTED (RRC-CONNECTED/RRC-Active) mode eNB: gNB MME: AMF (or SMF)

MME-EMM (EMM layer): AMF (Access and mobility Management Function) (5GMM layer)

MME-ESM (ESM layer), S-GW (control plane function), P-GW (control plane function): SMF (Session Management Function) (5GSM layer)

S-GW (user plane function)/P-GW (user plane function): UDF (User Data Function)

S1AP (interface/message): N2 (interface/message)

NAS (signalling connection/interface): N1 (connection/interface)

In the 5G system, the MME-EMM is mapped to the AMF, the MME-ESM is mapped to the SMF, an interface between the MME-EMM and MME-AMF is mapped to N11, and an interface between the MME-EMM and the eNB is mapped to N2.

Thus, the description of the present disclosure can be equally applied to the 5G system by replacing the description of the present disclosure according to the mapping relationship described above.

In the following description of the present disclosure, Mode 3 means a mode in which the eNB (base station) providing V2X service (e.g., V2X communication) dynamically allocates specific resources the UE will use, and the UE confirms resources, that the UE will use, through the physical channel and then performs transmission using the corresponding resources. On the other hand, Mode 4 refers to a mode in which after the UE receives one or multiple transmission pools from the network, the UE selects resources for the transmission in the pool by itself and sends a message. Hence, the Mode 4 is referred to as a UE autonomous resource selection mode, and the Mode 3 is referred to as a scheduled resource allocation mode.

Embodiment 1

Observation 1) As described above, in a cross-carrier operation, a serving cell can instruct the UE to perform V2X communication on a different carrier frequency.

Currently, the definition of 'Not Served by E-UTRAN' in 3GPP TS 24.386 follows 3GPP TS 24.334. The definition of 'Not Served by E-UTRAN' in 3GPP TS 24.334 is as follows.

"Not Served by E-UTRAN" is defined when the UE is either:
- out of E-UTRAN coverage;
- within E-UTRAN coverage but not camped on any cell;
- within E-UTRAN coverage but camped on a non-E-UTRAN cell; or
- camped on an E-UTRAN cell not operating on the carrier frequency provisioned for ProSe direct service.

This last case may correspond to a potential part impacted by cross-carrier scheduling.

There was a discussion about how to define a behavior on a frequency handover scenario in the RAN2 working group. The UE behavior to support the scenario is specified in subcluase 10.2.1 of 3GPP TS 24.334 as follows:

If the UE is camped on an E-UTRAN cell not operating on the carrier frequency provisioned for ProSe direct communication which indicates that ProSe direct communication is supported by the network, the UE can perform either ProSe direct communication procedures (i.e., procedures in which the UE uses provisioned radio resources) specified in subclause 10.2.3 or ProSe direct communication procedures (i.e., ProSe direct communication procedures not performed by the serving E-UTRAN) specified in subclause 10.2.2.

On the above, the UE is camped on an E-UTRAN cell not operating on the carrier frequency provisioned for ProSe direct communication which provides empty system information block (SIB) 18 which does not include ProSe resource in SIB 21.

When the UE is camped on the cell, the UE can perform either:
- operation for 'Served by E-UTRAN'; in this instance, the UE performs a Service Request procedure if in the EMM-IDLE mode. When the UE enters the EMM-CONNECTED mode, the cell can make the UE perform handover to the carrier frequency provisioned for ProSe direct communication.
- operation for 'Not served by E-UTRAN'; the UE selects the carrier frequency provisioned for ProSe direct service and can perform V2X communication on the selected carrier frequency if it does not cause interference.

Observation 2) The UE can be considered as either 'Served by E-UTRAN' or 'Not Served by E-UTRAN', if the UE is camped on an E-UTRAN cell not operating on the carrier frequency provisioned for ProSe direct communication which indicates that ProSe direct communication is supported by the network.

Observation 3) In ProSe, the case of supporting frequency handover is considered to be exceptional. The UE operation to support the case is specified in the procedure text, and CT1 working group decided not to change the definition of 'Not served by E-UTRAN'.

Hence, the present disclosure proposes the following operations.

When coming the discussion to V2X from ProSe, several features are changed. One of examples is that in V2X communication over PC5 (direct communication interface between UEs/vehicles, here PC may be understood as an abbreviation of ProSe (proximity service) communication, but PC5 itself may be understood as an interface name), multiple carrier frequencies can be provisioned per one geographic area while only one carrier frequency is provisioned per one geographic area in ProSe direct communication. Thus, the UE can perform V2X communication over PC5 on one or more carrier frequencies per geographic area.

Additionally, a cross-carrier operation has been introduced. For cross-carrier scheduling, the following two cases with respect to a cell operation can be considered:
1. The cell provides empty SIB 21 (i.e., the cell does not provide any V2X resource in SIB 21).
2. The cell provides SIB 21 with resource pools for different carrier frequencies.

In the case 1, it can be divided into two sub-cases according to the carrier frequency operation as follows:
1. An E-UTRAN cell provides empty SIB 21 (i.e., the cell does not provide any V2X resource in SIB 21).
A. The cell is not operating on the carrier frequency provisioned.
B. The cell is operating on the carrier frequency provisioned.

In the case 2, it can be divided into various cases depending on a carrier frequency provided by the serving cell and an operating carrier frequency of the serving cell (i.e., whether the carrier frequency on which the cell is operating is provisioned in the UE and whether the cell provides the carrier frequency provisioned in the UE).
2. An E-UTRAN cell provides SIB 21 with resource pools for different carrier frequencies.
A. The cell is not operating on the carrier frequency provisioned.
i. More than one of carrier frequency provided in SIB 21 was provisioned in the UE.
ii. None of the carrier frequency provided in SIB 21 was provisioned in the UE.
B. The cell is operating on the carrier frequency provisioned.
i. More than one carrier frequency provided in SIB 21 was provisioned in the UE.
ii. None of the carrier frequency provided in SIB 21 was provisioned in the UE.

There are several cases which may provide potential impacts in the existing definition of 'Not served by E-UTRAN' (especially, in the case of camping on an E-UTRAN cell not operating on the carrier frequency provisioned for V2X communication over PC5). However, it can be seen from the observation 2 and the observation 3 that it was difficult to reflect an exceptional case in the existing definition of 'Not served by E-UTRAN'. Thus, a procedure text is used for covering the exceptional case. Additionally, for the case of V2X communication, when considering new features (e.g., multiple carrier frequencies are provisioned, and cross-carrier scheduling needs to be supported), it becomes more difficult. Thus, the present disclosure proposes to provide a UE operation for supporting the exceptional case while keeping the existing definition of 'Not served by E-UTRAN'.

Proposal 1: it does not change the existing definition of 'Not served by E-UTRAN' and provides a UE operation for supporting the exceptional cases.

Case 1-A is the same as a case of supporting inter-frequency handover in ProSe. Thus, the present disclosure proposes a UE operation that is aligned with the case of supporting the inter-frequency handover in ProSe. This means that the UE performs an operation of 'Served by E-UTRAN' or 'Not served by E-UTRAN'.

Proposal 2: If the UE is camped on an E-UTRAN cell that does not operate on the carrier frequency provisioned for V2X communication over PC5 and does not provide any resource for V2X communication over PC5, the UE can perform either the 'Served by E-UTRAN' operation (requesting radio resources for V2X communication over PC5 as specified in subclause 10.2.2 and performing transmission of V2X communication over PC5 as specified in subclause 6.1.2.2) or the 'Not served by E-UTRAN' operation (selecting radio resources for V2X communication over PC5 as specified in subclause 6.1.2.3 and performing transmission of V2X communication over PC5 as specified in subclause 6.1.2.2).

Case 1-B is a new scenario generated by cross-carrier scheduling in V2X communication over PC5 which does not exist in ProSe.

In cases 2-A-ii) and 2-B-ii), the serving cell provides carrier frequencies but none of carrier frequency is provisioned for V2X communication over PC5. In this case, the UE should be allowed to find another cell operating on a provisioned carrier frequency. To this end, the UE should consider the cases 2-A-ii and 2-B-ii as 'Not served by E-UTRAN'. The UE operation is common for the cases 2-A-ii and 2-B-ii. It means that the UE operation does not depends on whether or not the serving cell operates on the carrier frequency provisioned for V2X communication over PC5.

Proposal 3) If the UE is camped on an E-UTRAN cell providing carrier frequencies for V2X communication over PC5 but none of the carrier frequencies are provisioned for V2X communication over PC5, the UE shall perform the 'Not served by E-UTRAN' operation (selecting radio resources for V2X communication over PC5 as specified in subclause 6.1.2.3 and performing transmission of V2X communication over PC5 as specified in subclause 6.1.2.2).

In cases 2-A-i) and 2-B-i), the following two UE operations may be considered.

1. If the UE intends to use carrier frequencies provisioned for V2X communication over PC5 provided by the cell, the UE selects one carrier frequency among the carrier frequencies provisioned for V2X communication over PC5 and searches a cell operating on the selected carrier frequency. If the UE finds the cell operating on the carrier frequency, the UE can perform the 'Served by E-UTRAN' operation for V2X communication over PC5 on the corresponding cell (requesting radio resources for V2X communication over PC5 as specified in subclause 10.2.2 and performing transmission of V2X communication over PC5 as specified in subclause 6.1.2.2).

2. If the UE does not intend to use carrier frequencies provisioned for V2X communication over PC5 provided by the cell, the UE performs the 'Not served by E-UTRAN' operation for V2X communication over PC5 (selecting radio resources for V2X communication over PC5 as specified in subclause 6.1.2.3 and performing transmission of V2X communication over PC5 as specified in subclause 6.1.2.2).

For example, the UE has performed the operation of 1, but the UE can perform the operation of 2 if the UE fails to find the cell on the corresponding carrier frequency.

As another example, the UE can repeat the operation of 1 until the UE finds the cell operating on the selected carrier frequency. If there is no more carrier provisioned for V2X communication over PC5 in a list of carrier frequencies provided from the cell, or there is only the carrier frequency that the UE fails to search, the UE can perform the operation of 2.

Further, the UE may exclude the carrier frequency that the UE fails to search before performing the operation of 1.

The requirement that the UE shall perform V2X communication on a specific carrier frequency was prescribed. However, it is possible by the UE implementation. Thus, it may not be prescribed in the standard.

Proposal 4) If the UE is camping on an E-UTRAN cell providing carrier frequencies for V2X communication over PC5, one or more carrier frequencies have been provisioned for V2X communication over PC5, and the UE intends to use the carrier frequencies provisioned for V2X communication over PC5 provided by the cell, the UE performs the 'Served by E-UTRAN' operation (requesting radio resources for V2X communication over PC5 as specified in subclause 10.2.2 and performing transmission of V2X communication over PC5 as specified in subclause 6.1.2.2). If the UE is camping on an E-UTRAN cell providing carrier frequencies for V2X communication over PC5, one or more carrier frequencies have been provisioned for V2X communication over PC5, and the UE does not intend to use the carrier frequencies provisioned for V2X communication over PC5 provided by the cell, the UE performs the 'Not served by E-UTRAN' operation (selecting radio resources for V2X communication over PC5 as specified in subclause 6.1.2.3 and performing transmission of V2X communication over PC5 as specified in subclause 6.1.2.2).

The V2X initiation operation described above based on the above proposals is described as follows.

6.1.2.1 Initiation

The upper layers can request the UE to send a V2X message of a V2X service identified by a V2X service identifier using V2X communication over PC5.

The request from the upper layers includes:
a) the V2X message;
b) the V2X service identifier of the V2X service for the V2X message;
c) a type of data in the V2X message (IP or non-IP);
d) if the V2X message contains non-IP data, an indication to set a non-IP type field of non-IP type PDU to a value corresponding to a V2X message family; and
e) V2X message priority.

Upon receiving a request from the upper layers to send a V2X message of a V2X service identified by a V2X service identifier using V2X communication over PC5, the UE proceeds as follows:

a) if the following conditions are met (i.e., a) means the operation of "served by E-UTRAN"):
1) the UE is "served by E-UTRAN";
2) the UE intends to use the radio resources (i.e., carrier frequency) provided by an E-UTRAN cell;
3) the registered PLMN is in a list of PLMNs in which the UE is authorized to use V2X communication over PC5 when the UE is "served by E-UTRAN"; and
4) the V2X service identifier of the V2X service is included in the list of V2X services authorized for V2X communication over PC5, or the UE is configured with a default destination Layer-2 identifier (ID) for V2X communication over PC5;

then, the UE:
1) requests radio resources for V2X communication over PC5 as specified in subclause 10.2.2; and
2) performs transmission of V2X communication over PC5 as specified in subclause 6.1.2.2.

b) if the following conditions are met (i.e., b) means the operation of "Not served by E-UTRAN"):
1) the UE is:
A) "not served by E-UTRAN"; or
B) in a limited service state, if a reason for the UE being in the limited service state is one of the followings;
i) the UE is unable to find a suitable cell in the selected PLMN;
ii) the UE receives an ATTACH REJECT message or a TRACKING AREA UPDATE REJECT message or a SERVICE REJECT message including the EMM cause #11 "PLMN not allowed", or the UE receives a LOCATION UPDATING REJECT message or a GPRS ATTACH REJECT message or a ROUTING AREA UPDATE REJECT message including the EMM cause #11 "PLMN not allowed"; or iii) the UE receives an ATTACH REJECT message or a TRACKING AREA UPDATE REJECT message or a SERVICE REJECT message including the EMM cause #7 "EPS services not allowed", or the UE receives a LOCATION UPDATING REJECT message or a GPRS ATTACH REJECT message or a ROUTING AREA UPDATE REJECT message or a SERVICE REJECT message including the EMM cause #7 "GPRS services not allowed"; or C) in the limited service state for reasons other than the i), ii) and iii), and located in a geographical area for which the UE is provisioned with "non-operator managed" radio parameters;

2) the UE is authorized to use V2X communication over PC5 when the UE is not served by E-UTRAN; and 3) the V2X service identifier of the V2X service is included in the list of V2X services authorized for V2X communication over PC5, or the UE is configured with a default destination Layer-2 ID for V2X communication over PC5;

then, the UE:

1) selects radio resources for V2X communication over PC5 as specified in subclause 6.1.2.3; and 2) performs transmission of V2X communication over PC5 as specified in subclause 6.1.2.2;

Otherwise, the UE does not perform V2X communication over PC5.

If the UE is camped on an E-UTRAN cell that does not operate on the carrier frequency provisioned for V2X communication over PC5 and does not provide any resource for V2X communication over PC5, the UE can be considered as 'Served by E-UTRAN' (i.e., request of radio resources for V2X communication over PC5 as specified in subclause 10.2.2) or 'Not served by E-UTRAN' (i.e., selection of radio resources for V2X communication over PC5 as specified in subclause 6.1.2.3). Additionally, the UE performs transmission of V2X communication over PC5 as specified in subclause 6.1.2.2.

If the UE is camped on an E-UTRAN cell providing carrier frequencies for V2X communication over PC5 but none of the carrier frequencies (i.e., among the carrier frequencies provided by the cell) are provisioned for V2X communication over PC5, the UE is considered as 'Not served by E-UTRAN' (i.e., selection of radio resources for V2X communication over PC5 as specified in subclause 6.1.2.3). Additionally, the UE performs transmission of V2X communication over PC5 as specified in subclause 6.1.2.2.

If the UE is camped on an E-UTRAN cell providing carrier frequencies for V2X communication over PC5 but one or more carrier frequencies (i.e., among the carrier frequencies provided by the cell) are provisioned for V2X communication over PC5, the UE performs one of the followings:

a) if the UE intends to use carrier frequencies provided by the cell, the UE is considered as 'Served by E-UTRAN' (i.e., the UE selects one carrier frequency among provisioned carrier frequencies provided by the cell and requests radio resources for V2X communication over PC5 on the selected carrier frequency); or b) if the UE does not intend to use carrier frequencies provided by the cell, the UE is considered as 'Not served by E-UTRAN' (i.e., the UE selects radio resources for V2X communication over PC5 as specified in subclause 6.1.2.3).

Additionally, the UE performs transmission of V2X communication over PC5 as specified in subclause 6.1.2.2.

Here, whether the UE performs the a) or b) may be left up to UE implementation. In the a), the UE may need to (re-)select the cell operating on the selected carrier frequency.

The proposals 3 and 4 mentioned above are described in more detail below.

1) If the UE is camped on an E-UTRAN cell providing carrier frequencies for V2X communication over PC5 but none of the carrier frequencies for V2X communication over PC5 are provisioned for V2X communication over PC5, the UE is considered as 'Not served by E-UTRAN' (i.e., selection of radio resources for V2X communication over PC5 as specified in subclause 6.1.2.3).

If the UE is camped on an E-UTRAN cell providing carrier frequencies for V2X communication over PC5 but one or more carrier frequencies for V2X communication over PC5 are provisioned for V2X communication over PC5, the UE performs one of the followings:

a) if the UE intends to use carrier frequencies provided by the cell, the UE is considered as 'Served by E-UTRAN' (i.e., the UE selects one carrier frequency among provisioned carrier frequencies provided by the cell and selects radio resources for V2X communication over PC5 on the selected carrier frequency); or b) if the UE does not intend to use carrier frequencies provided by the cell, the UE is considered as 'Not served by E-UTRAN' (i.e., the UE selects radio resources for V2X communication over PC5 as specified in subclause 6.1.2.3).

In the a), the UE can reselect the cell operating on the selected carrier frequency. Further, the UE requests radio resources for V2X communication over PC5 on the selected carrier frequency from the cell.

2) If the UE is camped on an E-UTRAN cell providing a carrier frequency for V2X communication over PC5 not a provisioned carrier frequency for V2X communication over PC5 the UE intends to use, the UE is considered as 'Not served by E-UTRAN' (the UE selects radio resources for V2X communication over PC5 as specified in subclause 6.1.2.3 and performs transmission of V2X communication over PC5 as specified in subclause 6.1.2.2). Otherwise, the UE is considered as 'Served by E-UTRAN' (the UE selects one carrier frequency among provisioned carrier frequencies provided by the cell and selects radio resources for V2X communication over PC5 on the selected carrier frequency).

3) If the UE is camped on an E-UTRAN cell providing a carrier frequency for V2X communication over PC5 different from a provisioned carrier frequency for V2X communication over PC5 the UE intends to use, the UE is considered as 'Not served by E-UTRAN' (i.e., the UE selects radio resources for V2X communication over PC5 as specified in subclause 6.1.2.3 and performs transmission of V2X communication over PC5 as specified in subclause 6.1.2.2).

4) The following conditions can be added as conditions of 'Not served by E-UTRAN'.

"Not served by E-UTRAN" is defined when the UE is:
 outside of E-UTRAN coverage;
 within E-UTRAN coverage but not camped on any cell;
 within E-UTRAN coverage but camped on a non-E-UTRAN cell;
 camped on an E-UTRAN cell providing a carrier frequency for V2X communication over PC5 different from a provisioned carrier frequency the UE intends to use.

Here, the 'E-UTRAN cell providing a carrier frequency for V2X communication over PC5' may be in Mode 3 or Mode 4 and means a cell performing a cross carrier scheduling operation.

The cell performing the cross carrier scheduling operation corresponds to the following two cases:

1. cell providing only carrier frequency list information (e.g., 'v2x-InterFreqInfoList') (additionally, not providing radio resource)

2. cell providing both carrier frequency list information (e.g., 'v2x-InterFreqInfoList') and specific radio resources The new condition described above means to include both the 1) and the 2).

In the Mode 4, the UE may read the carrier frequency list information (e.g., 'v2x-InterFreqInfoList') included in SIB 21 broadcasted by a cell and decide whether it satisfies the above new condition.

In the Mode 3, the UE requests, from a camped cell, carrier frequency information and radio resources the UE intends to use (i.e., the UE sends a Sidelink_UE_Information message involving carrier frequency information the UE intends to use). Further, the UE may decide whether it satisfies the above new condition by receiving a response of the cell.

The proposal 2 mentioned above is described in more detail below.

If the UE is camped on an E-UTRAN cell that does not operate on the provisioned carrier frequency for V2X communication over PC5 and does not provide any radio resource and carrier frequency for V2X communication over PC5, the UE can request radio resources for V2X communication over PC5 or select radio resources for V2X communication over PC5 as specified in subclause 6.1.2.3.

Here, the cell not providing any radio resource and carrier frequency for V2X communication over PC5 may mean a cell operating in the Mode 3.

In the existing definition of 'Not served by E-UTRAN', if the UE is camped on an E-UTRAN cell not operating on the provisioned carrier frequency for V2X communication over PC5, the UE operates as 'Not served by E-UTRAN'. In this case, the following problem occurs.

When the UE is camped on a cell A operating on f1 (i.e., not-provisioned carrier frequency) and is in the Mode 3, 1. if the UE performs the operation of 'Not served by E-UTRAN' (the UE searches a cell operating on the provisioned carrier frequency), A. if a cell B operating on the provisioned carrier frequency is searched, the UE can perform V2X communication on the cell B.

B. else, if there is no cell operating on the provisioned carrier frequency, the UE is considered to be out of coverage (OOC) and performs V2X communication over PC5 on the carrier frequency.

In the 1-B, if the cell A provides f2 through the Mode 3, the UE operation specified in the 1-B may cause interference in a f2 operation of the cell A.

In this case, even if the UE operates as 'Served by E-UTRAN', the following problem occurs.

2. If the UE performs the operation of 'Served by E-UTRAN',

A. if the cell A provides f2 (provisioned carrier frequency), the UE can request radio resources from the cell.

B. else, if the cell A does not provide f2, the UE does not have an operable option (e.g., the UE does not search f3 (provisioned carrier frequency)).

As specified in the 2-B, the UE cannot perform V2X communication.

The above problem occurs for the following reason.

The UE cannot know what case will occur before each of 'Served by E-UTRAN' and 'Not Served by E-UTRAN' starts.

In this case, the following methods can be proposed to solve the above problem.

Method 1) The UE can operate in the following order.

1. If the UE is camped on an E-UTRAN cell not operating on the provisioned carrier frequency for V2X communication over PC5 and does not provide any radio resource and carrier frequency for V2X communication over PC5, the UE performs 'Served by E-UTRAN' (i.e., the UE selects radio resources for V2X communication over PC5).

2. If the E-UTRAN cell provides the provisioned carrier frequency for V2X communication over PC5 the UE intends to use, the UE performs V2X communication on the carrier frequency.

3. If the E-UTRAN cell does not provide the provisioned carrier frequency for V2X communication over PC5 the UE intends to use, the UE performs 'Not Served by E-UTRAN' (i.e., the UE selects radio resources for V2X communication over PC5).

Method 2) The UE operates in the following order.

1. If the UE is camped on an E-UTRAN cell that does not operate on the provisioned carrier frequency for V2X communication over PC5 and does not provide any radio resource and carrier frequency for V2X communication over PC5, the UE performs 'Not Served by E-UTRAN' (i.e., the UE selects radio resources for V2X communication over PC5).

2. If the UE finds a cell operating on the provisioned carrier frequency, the UE performs 'Served by E-UTRAN' on the cell (i.e., the UE requests radio resources for V2X communication over PC5).

A. If the cell provides the provisioned carrier frequency for V2X communication over PC5 the UE intends to use, the UE performs V2X communication over PC5 on the cell.

B. Else if the cell does not provide the provisioned carrier frequency for V2X communication over PC5 the UE intends to use, the UE performs 'Served by E-UTRAN' on the original serving cell in the step 1 (i.e., the UE requests radio resources for V2X communication over PC5).

3. Else if the UE cannot find a cell operating on the provisioned carrier frequency, the UE performs 'Served by E-UTRAN' on the original serving cell in the step 1 (i.e., the UE requests radio resources for V2X communication over PC5).

The Method 1 for first checking whether or not the UE provides 'the provisioned carrier frequency for V2X communication over PC5 the UE intends to use' in a current serving cell may be more effective than the Method 2.

The proposal 2 is described in more detail below.

The case where the condition of "camped on an E-UTRAN cell operating on the provisioned carrier frequency for V2X communication over PC5" in 'Not served by E-UTRAN' is omitted, and the following new condition is added is described.

When the UE is camped on an E-UTRAN cell providing a carrier frequency for V2X communication over PC5 different from the provisioned carrier frequency the UE intends to use;

For reference, in the new condition, 'an E-UTRAN cell providing the carrier frequency for V2X communication over PC5' may be Mode 3 or Mode 4 and may be a cell performing a cross carrier operation.

There are the following two cases for a cell operating cross-carrier scheduling:

1. cell providing only carrier frequency list information (e.g., 'v2x-InterFreqInfoList') (additionally, not providing radio resource)
2. cell providing both carrier frequency list information (e.g., 'v2x-InterFreqInfoList') and specific radio resources The new condition above means to include both the 1) and the 2).

In the Mode 4, the UE may read the carrier frequency list information (e.g., 'v2x-InterFreqInfoList') included in SIB 21 broadcasted by a cell and decide whether it satisfies the above new condition.

In the Mode 3, the UE requests, from a camping cell, carrier frequency information and radio resources the UE intends to use (i.e., the UE sends a Sidelink_UE_Information message involving carrier frequency information the UE intends to use). Further, the UE may decide whether it satisfies the new condition above by receiving a response of the cell.

The UE camped on a cell operating in the Mode 3 cannot decide whether or not the corresponding cell meets the new condition before the UE performs 'Served by E-UTRAN' (i.e., the UE requests, from the cell, the provisioned carrier frequency for V2X communication over PC5 the UE intends to use). Then, in this case, the present disclosure proposes to apply a concept of the Method 1. A difference from the Method 1 is that the Method 1 is limited to applying to only if the UE is camped on an E-UTRAN cell not operating on the provisioned carrier frequency for V2X communication over PC5. However, the following Method 3 can be applied as long as the UE is camped on a cell operating in the Mode 3, regardless of the above condition.

[Method 3] The UE operates in the following order.

1. If the UE is camped on an E-UTRAN cell not providing any radio resource and carrier frequency for V2X communication over PC5, the UE performs 'Served by E-UTRAN' (i.e., the UE requests radio resources for V2X communication over PC5).
2. If the E-UTRAN cell provides the provisioned carrier frequency for V2X communication over PC5 the UE intends to use, the UE performs V2X communication over PC5 as specified in TS 36.331.
3. If the E-UTRAN cell does not provide the provisioned carrier frequency for V2X communication over PC5 the UE intends to use, the UE performs 'Not served by E-UTRAN' (i.e., the UE selects radio resources for V2X communication over PC5 as specified in subclause 6.1.2.3).

In this case, the present disclosure proposes to apply a concept of the Method 2. A difference from the Method 2 is that the Method 1 is limited to only if the UE is camped on an E-UTRAN cell not operating on the provisioned carrier frequency for V2X communication over PC5. However, the following Method 4 can be applied as long as the UE is camped on a cell operating in the Mode 3, regardless of the above condition.

[Method 4] The UE operates in the following order.

1. If the UE is camped on an E-UTRAN cell not providing any radio resource and carrier frequency for V2X communication over PC5, the UE performs 'Not served by E-UTRAN' (i.e., the UE selects radio resources for V2X communication over PC5 as specified in subclause 6.1.2.3).
2. If the UE finds a cell operating on the provisioned carrier frequency, the UE selects the cell and performs 'Served by E-UTRAN' on the cell (i.e., the UE requests radio resources for V2X communication over PC5).

A. If the cell provides the provisioned carrier frequency for V2X communication over PC5 the UE intends to use, the UE performs V2X communication over PC5 on the cell.

B. Else if the cell does not provide the provisioned carrier frequency for V2X communication over PC5 the UE intends to use, the UE performs 'Served by E-UTRAN' on the serving cell in the step 1 (i.e., the UE requests radio resources for V2X communication over PC5).

3. Else if the UE cannot find a cell operating on the provisioned carrier frequency, the UE performs 'Served by E-UTRAN' on the original serving cell in the step 1 (i.e., the UE requests radio resources for V2X communication over PC5).

The Method 3 for first checking whether or not the UE provides the provisioned carrier frequency for V2X communication over PC5 the UE intends to use in a current serving cell may be more effective than the Method 4.

Implementations of the Method 3 are described below.

If the UE is camped on an E-UTRAN cell not providing any radio resource and carrier frequency for V2X communication over PC5, the UE performs 'Served by E-UTRAN' (i.e., the UE requests radio resources for V2X communication over PC5).

The Method 3 can be implemented through the above-described implementation method. In the step 1 of the Method 3, the UE requests radio resources from a cell (i.e., sends a Sidelink_UE_Information message involving carrier frequency information the UE intends to use), and can decide the steps 2 and 3 by receiving a response of the cell.

If triggering conditions of the following step 3 are met,

If an E-UTRAN cell does not provide the provisioned carrier frequency for V2X communication over PC5 the UE intends to use, the UE considers this case as 'Not served by E-UTRAN' by a new condition of 'Not served by E-UTRAN' and performs 'Not served by E-UTRAN'.

If triggering conditions of the following step 2 are met,

If an E-UTRAN cell provides the provisioned carrier frequency for V2X communication over PC5 the UE intends to use, the UE may perform a subsequent operation by 'Served by E-UTRAN' of the step 1. The subsequent operation is described in detail in 3GPP TS 36.331, and the detailed description may be combined with the present disclosure for reference.

The above-described operations proposed in the present disclosure are summarized as follows.

3.1 Definition i) 'Not served by E-UTRAN' for V2X communication: when the UE is either:
  out of E-UTRAN coverage;
  within E-UTRAN coverage but not camped on any cell;
  within E-UTRAN coverage but camped on a non-E-UTRAN cell; or
  camped on an E-UTRAN cell providing a carrier frequency for V2X communication over PC5 different from the provisioned carrier frequency the UE intends to use.

ii) V2X Service Identifier: Identifier of V2X service, for example, provider service identifier (PSID) or intelligent transport systems (ITS)-application identifier (AID) of V2X application 6.1.2.1 Initiation The upper layers can request the UE to send a V2X message of a V2X service identified by a V2X service identifier using V2X communication over PC5.

The request from the upper layers includes:
a) the V2X message;
b) the V2X service identifier of the V2X service for the V2X message;
c) a type of data in the V2X message (IP or non-IP);
d) if the V2X message contains non-IP data, an indication to set a non-IP type field of non-IP type PDU to a value corresponding to a V2X message family; and
e) V2X message priority.

Upon receiving a request from the upper layers to send a V2X message of a V2X service identified by a V2X service identifier using V2X communication over PC5, the UE proceeds as follows:

a) if the following conditions are met (i.e., a) means the operation of "served by E-UTRAN"):
 1) the UE is "served by E-UTRAN";
 2) the UE intends to use the radio resources (i.e., carrier frequency) provided by an E-UTRAN cell;
 3) the registered PLMN is in a list of PLMNs in which the UE is authorized to use V2X communication over PC5 when the UE is "served by E-UTRAN"; and
 4) the V2X service identifier of the V2X service is included in the list of V2X services authorized for V2X communication over PC5, or the UE is configured with a default destination Layer-2 identifier (ID) for V2X communication over PC5;
 then, the UE:
  1) requests radio resources for V2X communication over PC5 as specified in subclause 10.2.2; and
  2) performs transmission of V2X communication over PC5 as specified in subclause 6.1.2.2.

b) if the following conditions are met (i.e., b) means the operation of "Not served by E-UTRAN"):
 1) the UE is:
  A) "not served by E-UTRAN"; or
  B) in a limited service state, if a reason for the UE being in the limited service state is one of the followings;
   i) the UE is unable to find a suitable cell in the selected PLMN;
   ii) the UE receives an ATTACH REJECT message or a TRACKING AREA UPDATE REJECT message or a SERVICE REJECT message including the EMM cause #11 "PLMN not allowed", or the UE receives a LOCATION UPDATING REJECT message or a GPRS ATTACH REJECT message or a ROUTING AREA UPDATE REJECT message including the EMM cause #11 "PLMN not allowed"; or
   iii) the UE receives an ATTACH REJECT message or a TRACKING AREA UPDATE REJECT message or a SERVICE REJECT message including the EMM cause #7 "EPS services not allowed", or the UE receives a LOCATION UPDATING REJECT message or a GPRS ATTACH REJECT message or a ROUTING AREA UPDATE REJECT message or a SERVICE REJECT message including the EMM cause #7 "GPRS services not allowed"; or
   C) in the limited service state for reasons other than the i), ii) and iii), and located in a geographical area for which the UE is provisioned with "non-operator managed" radio parameters;
 2) the UE is authorized to use V2X communication over PC5 when the UE is not served by E-UTRAN; and
 3) the V2X service identifier of the V2X service is included in the list of V2X services authorized for V2X communication over PC5, or the UE is configured with a default destination Layer-2 ID for V2X communication over PC5;
 then, the UE:
  1) selects radio resources for V2X communication over PC5 as specified in subclause 6.1.2.3; and
  2) performs transmission of V2X communication over PC5 as specified in subclause 6.1.2.2;
 Otherwise, the UE does not perform V2X communication over PC5.

If the UE is camped on an E-UTRAN cell not providing any radio resource and carrier frequency for V2X communication over PC5, the UE requests radio resources for V2X communication over PC5.

In the present disclosure, the fact that the UE performs 'served by E-UTRAN' may be interpreted as that the UE is considered as 'served by E-UTRAN'. That is, it may be interpreted as when the UE is 'served by E-UTRAN' as specified in subclause 6.1.2.1.

Moreover, in the present disclosure, the fact that the UE performs 'Not served by E-UTRAN' may be interpreted as that the UE is considered as 'Not served by E-UTRAN'. That is, it may be interpreted as when the UE is 'Not served by E-UTRAN' as specified in subclause 6.1.2.1.

1. In the above description, the fact that the UE requests radio resources for V2X communication over PC5 means that the UE is allocated the radio resources upon the operation of 'Served by E-UTRAN'.

2. In the above description, the fact that the UE selects radio resources for V2X communication over PC5 as specified in subclause 6.1.2.3 means that the UE is allocated the radio resources upon the operation of 'Not served by E-UTRAN'.

If the meanings described in the 1 and 2 above are used, the UE can additionally perform the following operation.

Additionally, the following shall be met as a prerequisite for requesting, by the UE, radio resources for V2X communication over PC5 on the selected carrier frequency as specified in 3GPP TS 24.334 (i.e., for selecting, by the UE, the radio resources upon the operation of 'Served by E-UTRAN').

3) the registered PLMN is in a list of PLMNs in which the UE is authorized to use V2X communication over PC5 when the UE is "served by E-UTRAN"; and
4) the V2X service identifier of the V2X service is included in the list of V2X services authorized for V2X communication over PC5, or
the UE is configured with a default destination Layer-2 identifier (ID) for V2X communication over PC5;

Moreover, the following shall be met as a prerequisite for selecting, by the UE, radio resources for V2X communication over PC5 as specified in subclause 6.1.2.3 (i.e., for selecting, by the UE, the radio resources upon the operation of 'Not served by E-UTRAN').

2) the UE is authorized to use V2X communication over PC5 when the UE is "not served by E-UTRAN";
3) the V2X service identifier of the V2X service is included in the list of V2X services authorized for V2X communication over PC5, or the UE is configured with a default destination Layer-2 identifier (ID) for V2X communication over PC5;

If the above prerequisite is met, the UE can perform transmission of V2X communication over PC5 as specified in subclause 6.1.2.2 as a subsequent operation.

The 1 and 2 above may be used as the following more general meaning not the meaning described above.

That is, the fact that the UE requests radio resources for V2X communication over PC5 may be interpreted as that the UE performs 'Served by E-UTRAN', and also that the UE consider itself as 'Served by E-UTRAN'.

In addition, the fact that the UE selects radio resources for V2X communication over PC5 may be interpreted as that the UE performs 'Not served by E-UTRAN' as specified in subclause 6.1.2.3, and also that the UE consider itself as 'Not served by E-UTRAN'.

Figure 7:
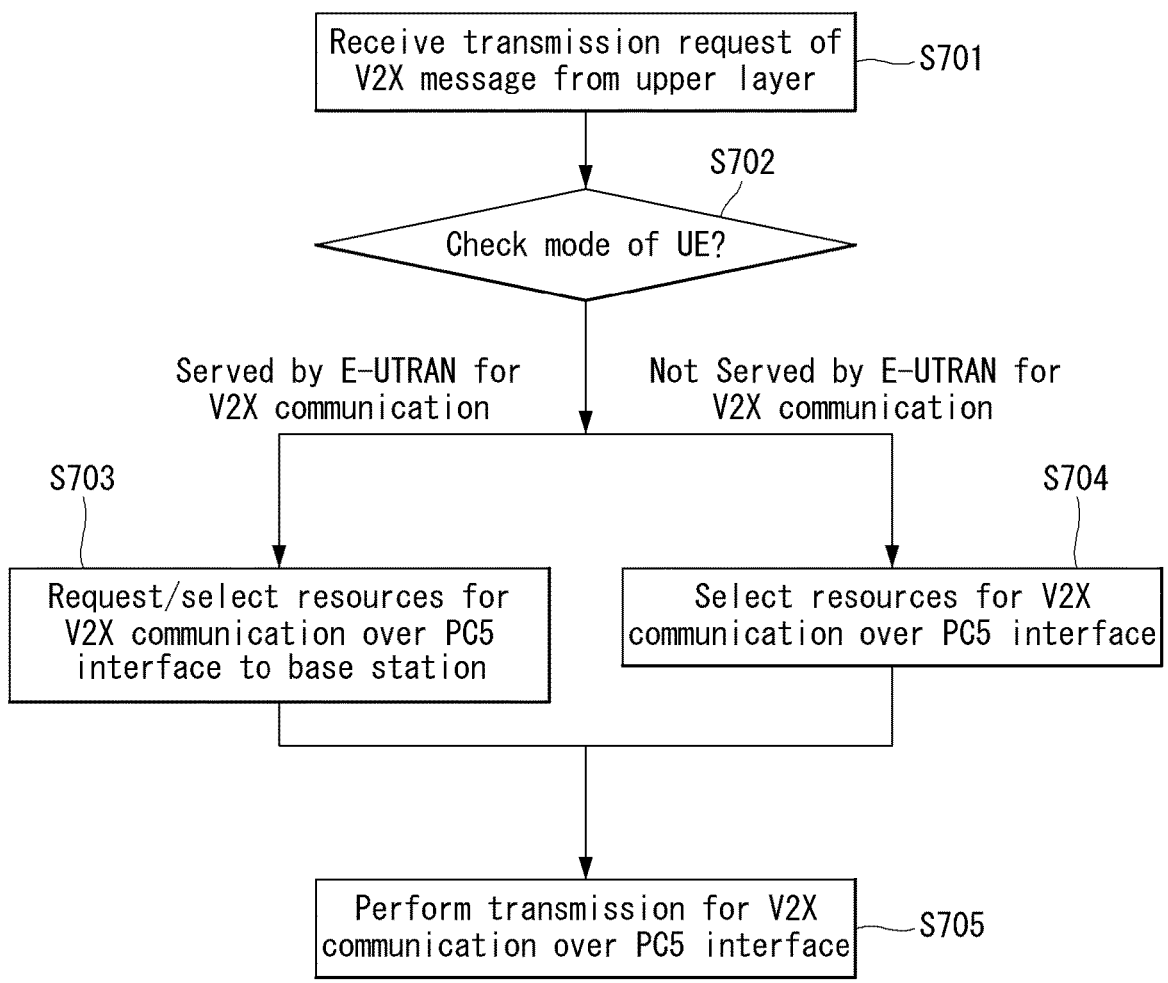
FIG. 7 illustrates a method for performing V2X communication according to an embodiment of the disclosure.

FIG. 7 illustrates a method for performing V2X communication according to an embodiment of the disclosure.

Referring to FIG. 7, a UE receives a transmission request of a V2X message from an upper layer in S701.

When the UE receives the transmission request of the V2X message as in S701, the UE checks its mode in S702.

That is, the UE checks whether the UE is 'Served by E-UTRAN for V2X communication' or 'Not Served by E-UTRAN for V2X communication'.

In this instance, carrier frequency and/or radio resource for V2X communication may be indicated in a system information block (SIB) 21 (e.g., in a parameter 'v2x-InterFreqInfoList-r14') broadcasted by a cell on which the UE is camped.

The cell on which the UE is camped may operate in Mode 3 in which a specific resource to be used by the UE for the V2X communication is allocated by a base station, or Mode 4 in which a resource to be used by the UE for the V2X communication is selected in a resource pool configured by the base station.

When the UE receives the transmission request of the V2X message, the UE requests a resource for the V2X communication over a PC5 interface from the base station or selects a resource for the V2X communication over the PC5 interface in a resource pool pre-configured by the base station, if the UE is 'Served by E-UTRAN for V2X communication', in S703.

In this instance, if the UE supports the V2X communication but is camped on a cell not providing any radio resource for the V2X communication over the PC5 interface, the UE may be considered as 'Served by E-UTRAN for V2X communication'. Here, the meaning of 'providing' may be interpreted as that a cell on which the UE is camped allocates radio resources, or that a cell on which the UE is camped indicates radio resources of another cell (or cell operating on another carrier frequency).

On the other hand, when the UE receives the transmission request of the V2X message, the UE selects a resource for the V2X communication over the PC5 interface if the UE is 'Not served by E-UTRAN for V2X communication', in S704 (i.e., as specified in subclause 6.1.2.3).

In this instance, if the UE is camped on a cell supporting the V2X communication, and a carrier frequency provided by the cell on which the UE is camped does not belong to a pre-configured carrier frequency, the UE may be considered as 'Not served by E-UTRAN for V2X communication'. Further, if a carrier frequency provided by the cell on which the UE is camped does not belong to a pre-configured carrier frequency the UE intends to use, the UE may be considered as 'Not served by E-UTRAN for V2X communication'. Here, the meaning of 'providing' may be interpreted as that a cell on which the UE is camped is operating on the carrier frequency, or that a cell on which the UE is camped indicates another carrier frequency.

If one or more carrier frequencies provided by the cell on which the UE is camped belong to the pre-configured carrier frequency, the UE may be considered as 'Not served by E-UTRAN for V2X communication' or 'Served by E-UTRAN for V2X communication'. Here, the meaning of 'providing' may be interpreted as that a cell on which the UE is camped operates on the carrier frequency, or that a cell on which the UE is camped indicates another carrier frequency.

For example, when the UE wants to perform the V2X communication on the pre-configured carrier frequency among one or more carrier frequencies provided by the cell on which the UE is camped, the UE may be considered as 'Served by E-UTRAN for V2X communication'. In this case, the UE can search a cell operating on a carrier frequency on which the UE wants to perform the V2X communication among the carrier frequency provided by the cell on which the UE is camped. Further, the UE can perform the V2X communication in the searched cell. However, if the UE fails to search the cell operating on the carrier frequency on which the UE wants to perform the V2X communication among the carrier frequency provided by the cell on which the UE is camped, the UE may be considered as 'Not served by E-UTRAN for V2X communication'.

On the other hand, when the UE does not want to perform the V2X communication on the pre-configured carrier frequency, the UE may be considered as 'Not served by E-UTRAN for V2X communication'.

The UE performs transmission for the V2X communication over the PC5 interface in S705 (i.e., as specified in subclause 6.1.2.2).

Overview of Device to which the Present Disclosure is Applicable

Figure 8:
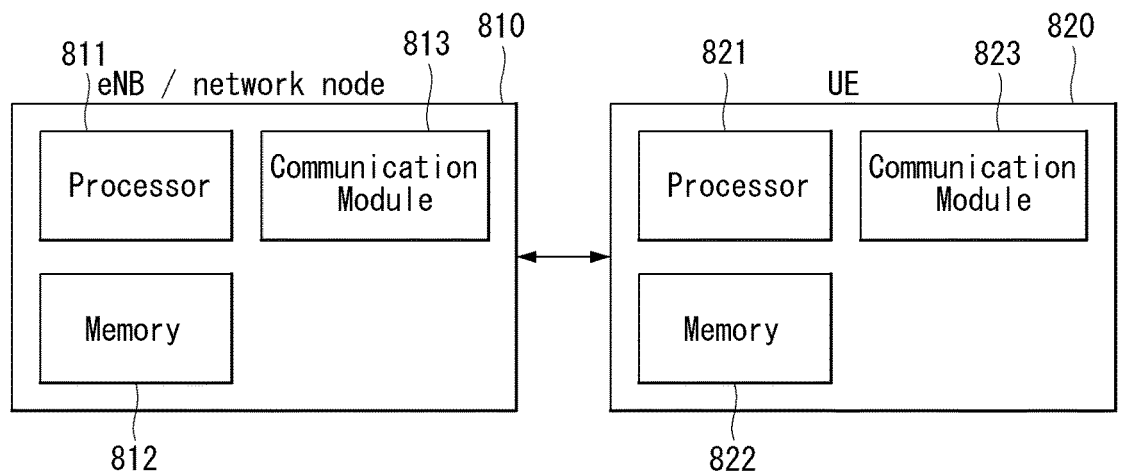
FIG. 8 illustrates a block configuration diagram of a communication device according to an embodiment of the disclosure.

FIG. 8 illustrates a block configuration diagram of a communication device according to an embodiment of the disclosure.

Referring to FIG. 8, a wireless communication system includes a network node 810 and a plurality of UEs 820.

The network node 810 includes a processor 811, a memory 812, and a communication module 813. The processor 811 implements functions, processes, and/or methods proposed in FIGS. 1 to 7. Layers of wired/wireless interface protocol may be implemented by the processor 811.

The memory 812 is connected to the processor 811 and stores various types of information for driving the processor 811. The communication module 813 is connected to the processor 811 and transmits and/or receives wired/wireless signals. An example of the network node 810 may correspond to a base station, MME, HSS, SGW, PGW, SCEF, SCS/AS, or the like. In particular, if the network node 810 is the base station, the communication module 813 may include a radio frequency (RF) unit for transmitting/receiving a radio signal.

The UE 820 includes a processor 821, a memory 822, and a communication module (or RF unit) 823. The processor 821 implements functions, processes, and/or methods proposed in FIGS. 1 to 7. Layers of a radio interface protocol may be implemented by the processor 821. In particular, the processor may include a NAS layer and an AS layer. The memory 822 is connected to the processor 821 and stores various types of information for driving the processor 821. The communication module 823 is connected to the processor 821 and transmits and/or receives a radio signal.

The memories 812 and 822 may be inside or outside the processors 811 and 821 and may be connected to the processors 811 and 821 through various well-known means. Further, the network node 810 (in case of the base station) and/or the UE 820 may have a single antenna or multiple antennas.

Figure 9:
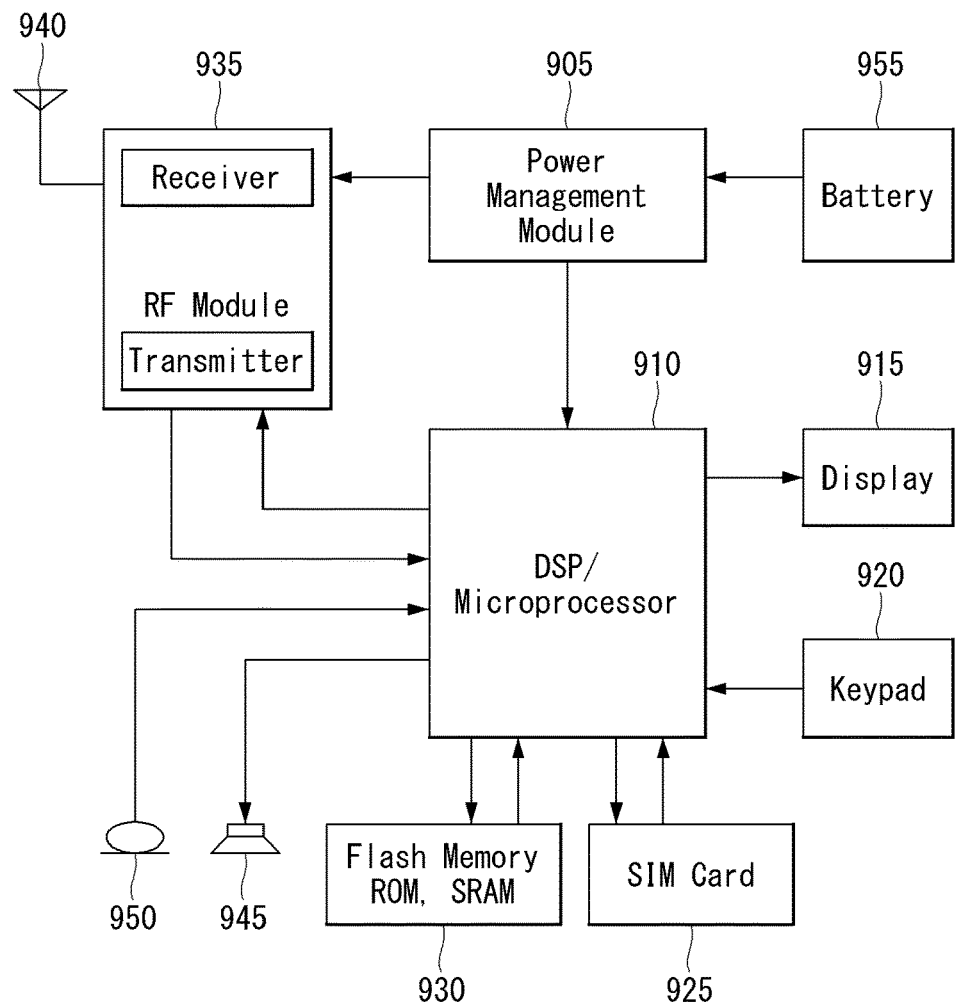
FIG. 9 illustrates a block configuration diagram of a communication device according to an embodiment of the disclosure.

FIG. 9 illustrates a block configuration diagram of a communication device according to an embodiment of the disclosure.

In particular, FIG. 9 illustrates in more detail the UE illustrated in FIG. 8.

Referring to FIG. 9, the UE may include a processor (or digital signal processor (DSP)) 910, an RF module (or RF unit) 935, a power management module 905, an antenna 940, a battery 955, a display 915, a keypad 920, a memory 930, a subscriber identification module (SIM) card 925 (which is optional), a speaker 945, and a microphone 950. The UE may also include a single antenna or multiple antennas.

The processor 910 implements functions, processes, and/or methods proposed in FIGS. 1 to 7. Layers of a radio interface protocol may be implemented by the processor 910.

The memory 930 is connected to the processor 910 and stores information related to operations of the processor 910. The memory 930 may be inside or outside the processor 910 and may be connected to the processors 910 through various well-known means.

A user inputs instructional information, such as a telephone number, for example, by pushing (or touching) buttons of the keypad 920 or by voice activation using the microphone 950. The processor 910 receives and processes the instructional information to perform an appropriate function, such as to dial the telephone number. Operational data may be extracted from the SIM card 925 or the memory 930. Further, the processor 910 may display instructional information or operational information on the display 915 for the user's reference and convenience.

The RF module 935 is connected to the processor 910 and transmits and/or receives an RF signal. The processor 910 forwards instructional information to the RF module 935 in order to initiate communication, for example, transmit a radio signal configuring voice communication data. The RF module 935 includes a receiver and a transmitter to receive and transmit the radio signal. The antenna 940 functions to transmit and receive the radio signal. Upon reception of the radio signal, the RF module 935 may transfer a signal to be processed by the processor 910 and convert the signal into a baseband. The processed signal may be converted into audible or readable information output via the speaker 945.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A system, it can be applied to various wireless communication systems, for example, the fifth generation (5G) system other than the 3GPP LTE/LTE-A system.

The invention claimed is:

1. A method for performing, by a user equipment (UE), a vehicle-to-everything (V2X) communication in a wireless communication system, the method comprising:
    receiving, from an upper layer, a request to send a V2X message;
    based on the received request to send the V2X message, selecting radio resources for V2X communication over PC5,
    wherein the UE is 'Not served by evolved universal terrestrial radio access network (E-UTRAN) for V2X communication'; and
    sending the V2X message over PC5,
    wherein the UE is considered as 'Not served by E-UTRAN for V2X communication', based on the UE being camped on a cell indicating that V2X communication over PC5 is supported, and carrier frequencies provided by the cell on which the UE is camped not belonging to a provisioned carrier frequency that UE intends to use.

2. The method of claim 1, wherein the cell on which the UE is camped operates on the carrier frequency, or the carrier frequency is indicated in a system information block (SIB) 21 broadcasted by the cell on which the UE is camped.

3. The method of claim 1, wherein the cell on which the UE is camped operates in a Mode 4 in which a resource to be used by the UE for the V2X communication is selected in a resource pool configured by the base station.

4. A user equipment (UE) performing a vehicle-to-everything (V2X) communication in a wireless communication system, the UE comprising:
    a transceiver configured to transmit and receive a radio signal; and
    a processor configured to control transceiver,
    wherein the processor is configured to:
    receive, via transceiver from an upper layer, a request to send a V2X message;
    based on the received via transceiver the request to send the V2X message, select radio resources for V2X communication over PC5, wherein the UE is 'Not served by evolved universal terrestrial radio access network (E-UTRAN) for V2X communication'; and sending the V2X message over PC5, wherein the UE is considered as 'Not served by E-UTRAN for V2X communication', based on the UE being camped on a cell indicating that V2X communication over PC5 is supported, and carrier frequencies provided by the cell on which the UE is camped does not belonging to a provisioned carrier frequency that UE intends to use.

5. The user equipment of claim 4, wherein the cell on which the UE is camped operates on the carrier frequency, or the carrier frequency is indicated in a system information block (SIB) 21 broadcasted by the cell on which the UE is camped.

6. The user equipment of claim 4, wherein the cell on which the UE is camped operates in a Mode 4 in which a resource to be used by the UE for the V2X communication is selected in a resource pool configured by a base station.

* * * * *